US009247168B2

(12) United States Patent
Yanada et al.

(10) Patent No.: US 9,247,168 B2
(45) Date of Patent: Jan. 26, 2016

(54) IMAGING DEVICE INCLUDING FOCUSING PIXELS

(71) Applicant: OLYMPUS CORPORATION, Tokyo (JP)

(72) Inventors: Takashi Yanada, Tokyo (JP); Yoshinobu Tanaka, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 42 days.

(21) Appl. No.: 14/133,977

(22) Filed: Dec. 19, 2013

(65) Prior Publication Data

US 2014/0293118 A1 Oct. 2, 2014

(30) Foreign Application Priority Data

Mar. 26, 2013 (JP) .................................. 2013-064876

(51) Int. Cl.
*H04N 5/369* (2011.01)
*H04N 5/232* (2006.01)

(52) U.S. Cl.
CPC ......... *H04N 5/3696* (2013.01); *H04N 5/23212* (2013.01)

(58) Field of Classification Search
CPC .................... H04N 5/23212; H04N 5/3696
See application file for complete search history.

(56) References Cited

U.S. PATENT DOCUMENTS

| 7,565,072 | B2* | 7/2009 | Ito | G02B 7/285 348/345 |
| 7,652,713 | B2* | 1/2010 | Yamasaki | G02B 7/34 348/345 |
| 8,576,315 | B2* | 11/2013 | Kita | H04N 5/23212 348/302 |
| 2012/0147238 | A1* | 6/2012 | Kita et al. | 348/302 |

FOREIGN PATENT DOCUMENTS

| JP | 2010-152161 A | 7/2010 |
| JP | 2010-185998 A | 8/2010 |
| JP | 2011-17842 A | 1/2011 |

* cited by examiner

*Primary Examiner* — Ahmed A Berhan
(74) *Attorney, Agent, or Firm* — Westerman, Hattori, Daniels & Adrian, LLP

(57) ABSTRACT

An imaging device includes a solid-state imaging device including focus detecting pixels which are arranged together in a region in which imaging pixels are arranged in a form of a two-dimensional (2D) matrix, a separating unit configured to separate imaging signals and focus detection signals from pixel signals output from the solid-state imaging device, to output horizontal direction focus detection signals output from a horizontal direction focus detecting pixel set including two focus detecting signals in a row direction and vertical direction focus detection signals output from a vertical direction focus detecting pixel set including two focus detecting signals in a column direction, a horizontal direction focus detection processing unit configured to convert a format in which the horizontal direction focus detection signals are output to a predetermined format.

7 Claims, 10 Drawing Sheets

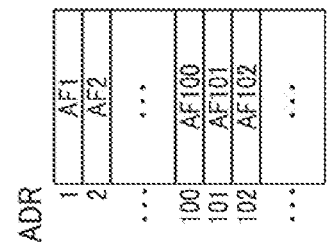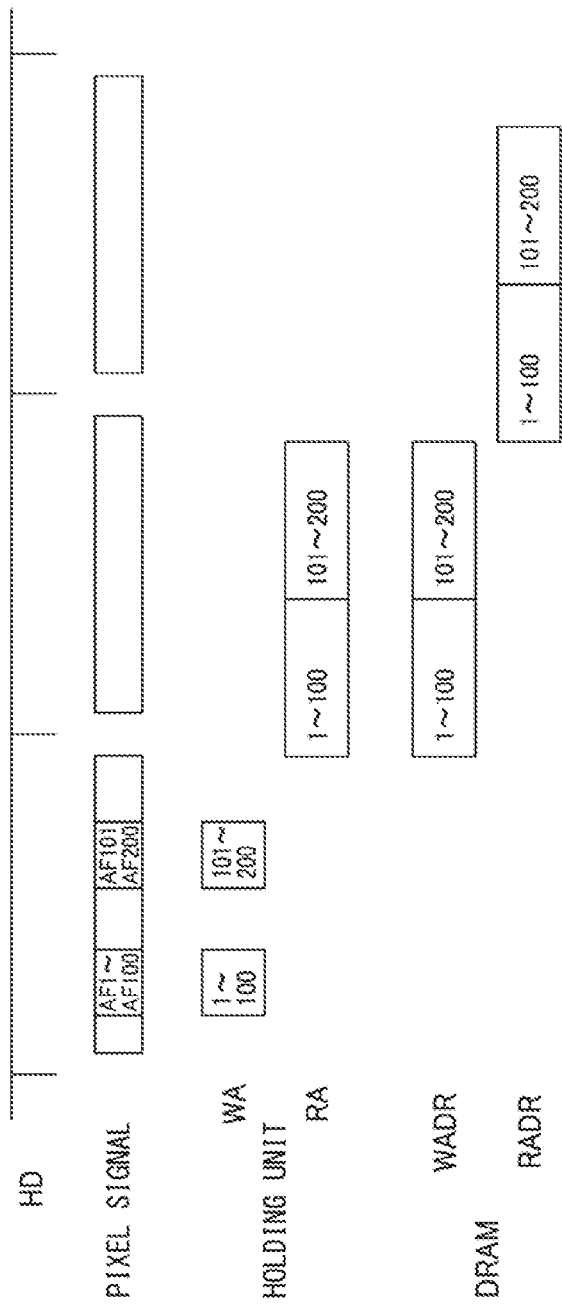

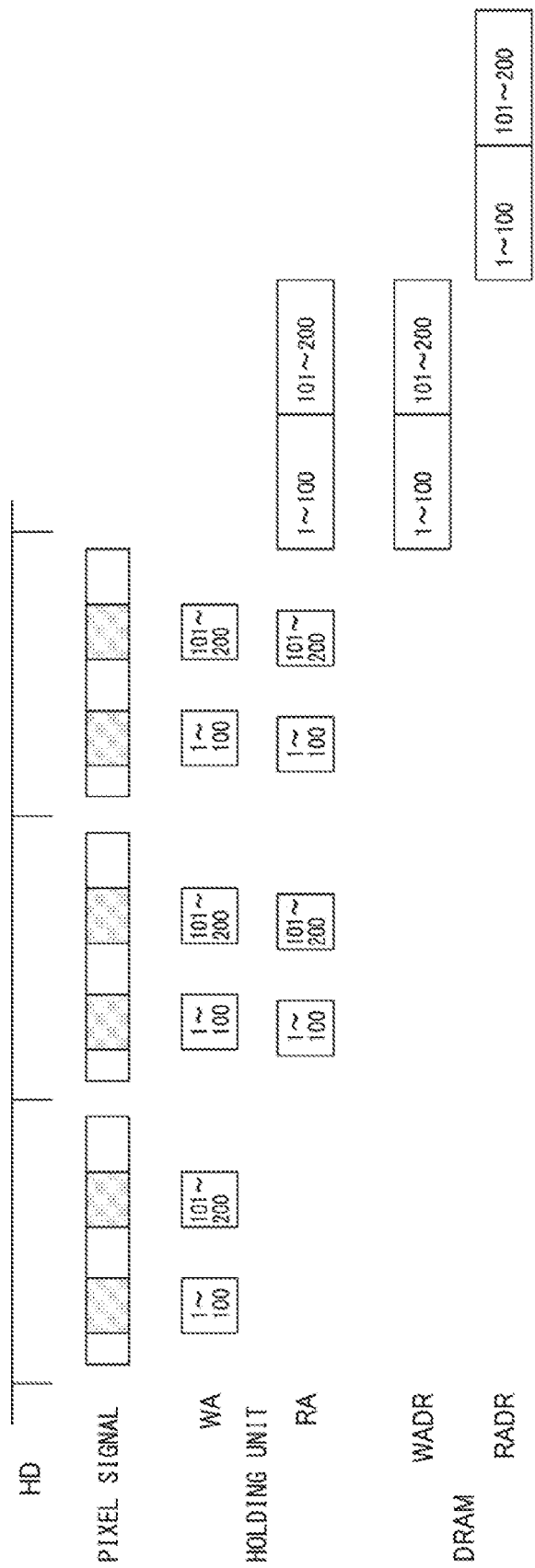

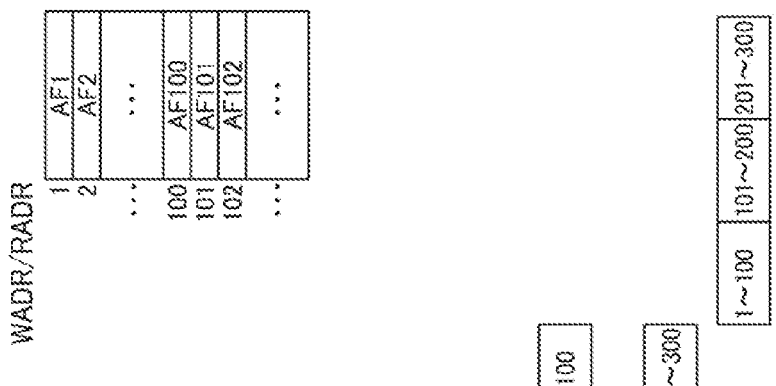
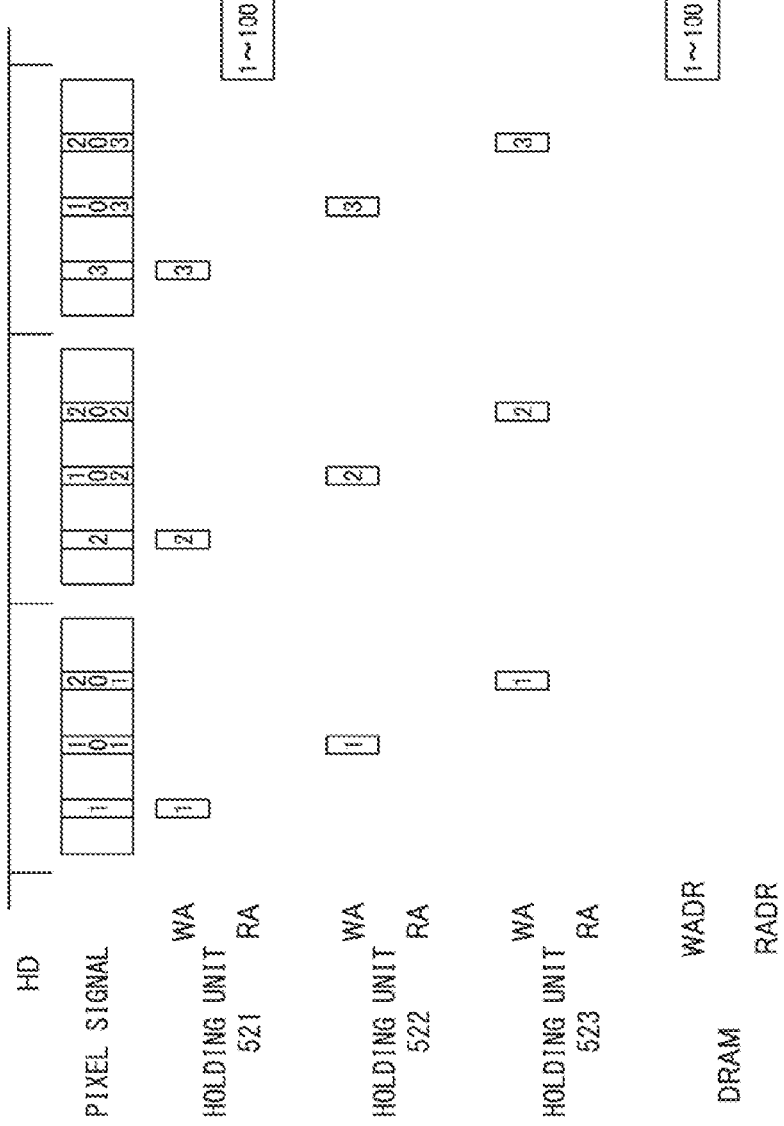
FIG. 7A
FIG. 7B

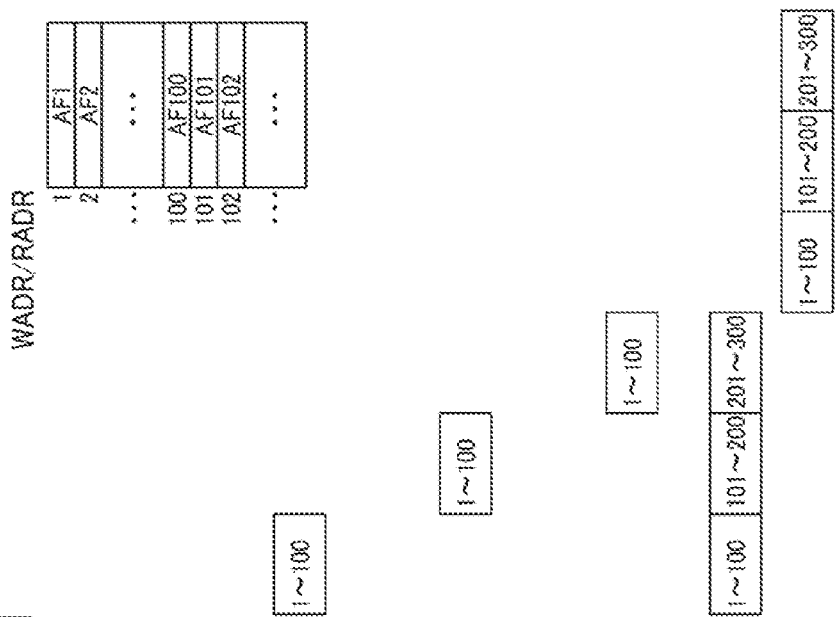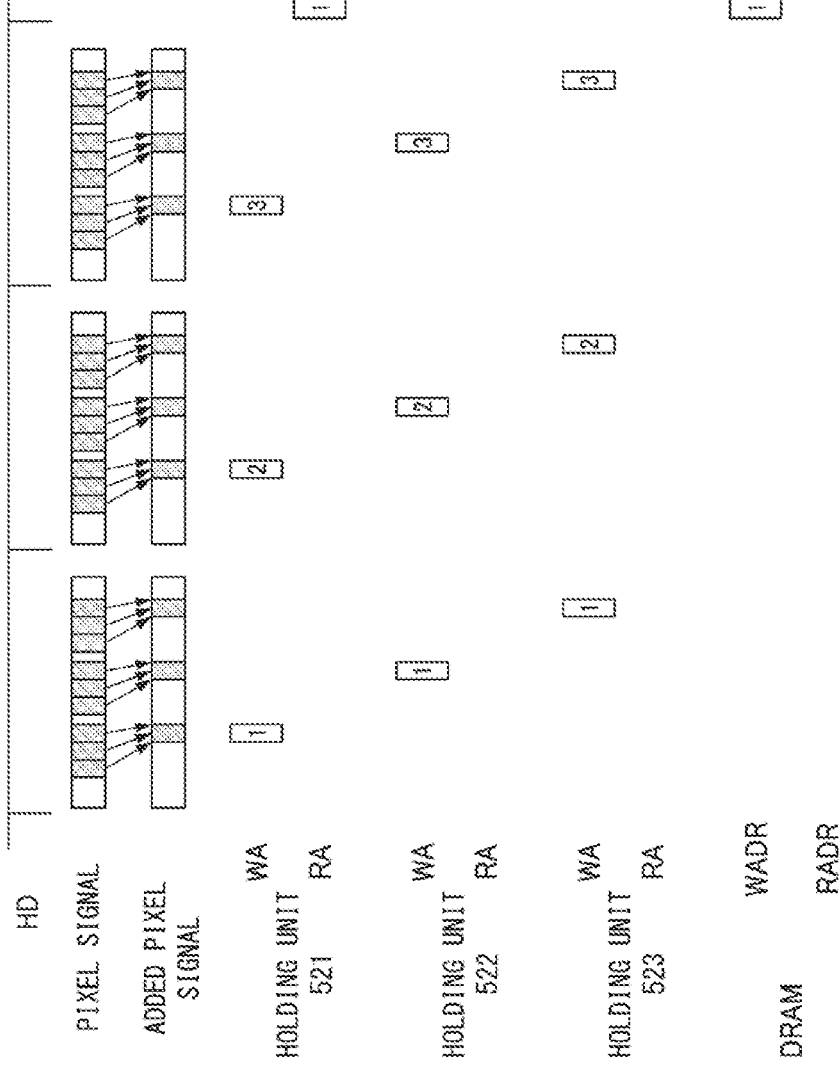
FIG. 9A
FIG. 9B

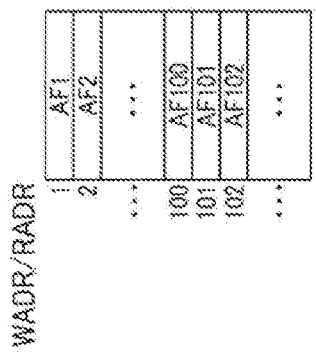
FIG. 10A PRIOR ART
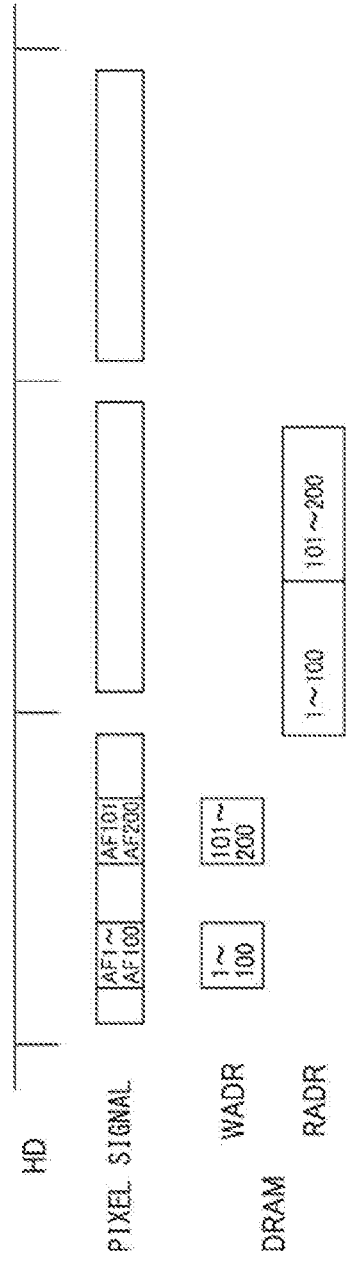
FIG. 10B PRIOR ART
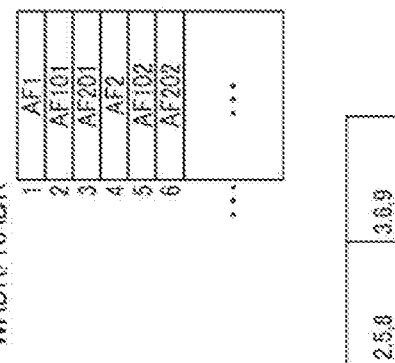
FIG. 10C PRIOR ART
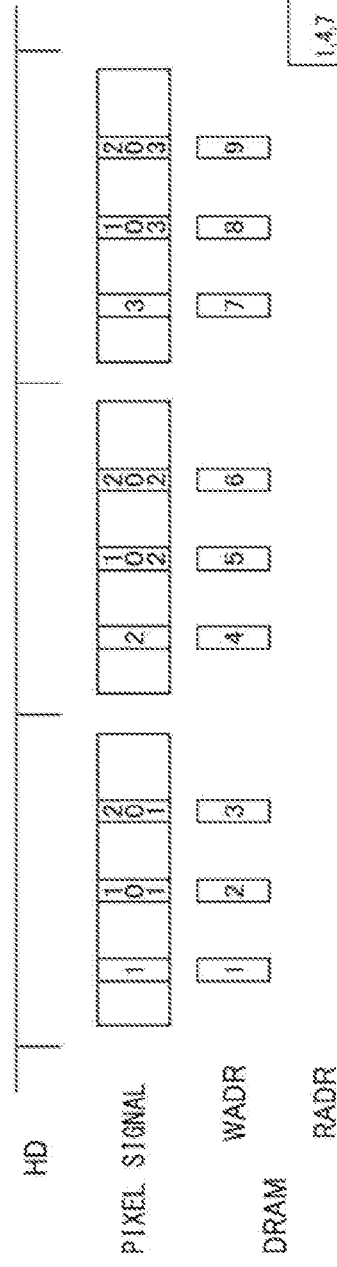
FIG. 10D PRIOR ART

IMAGING DEVICE INCLUDING FOCUSING PIXELS

BACKGROUND OF THE INVENTION

1. Field of the Invention

The present invention relates to an imaging device.

Priority is claimed on Japanese Patent Application No. 2013-064876, filed Mar. 26, 2013, the content of which is incorporated herein by reference.

2. Description of Related Art

In imaging devices such as digital still cameras or video cameras, an auto focus (AF) function of automatically focusing on a subject is provided as a function related to imaging. In an AF function of a related art, so-called phase difference AF of controlling a position of a focus lens based on information of a phase difference between left light and right light received by an AF sensor mounted in an imaging device is performed. Further, in an imaging device having no AF sensor, high-frequency components are extracted from pixel signals output from respective pixels of a solid-state imaging device equipped in the imaging device, for example using a high pass filter (HPF). After that, a position of a focus lens is controlled based on values of the high-frequency components of the respective pixels. Such process is called "imager AF".

In recent years, imaging pixels that output pixel signals obtained by performing photoelectric conversion on an optical image of a subject as imaging signals and either of the right and left sides are light-shielded in a region of pixels arranged in the solid-state imaging device, that is, an imaging region. Further, solid-state imaging devices in which focus detecting pixels that output pixel signals representing a quantity of received light of a left or right side of incident subject light as focus detection signals are arranged together have been proposed. An imaging device with such a solid-state imaging device calculates a phase difference using the focus detection signals output from the focus detecting pixels. Through this operation, the same AF function as in an imaging device that includes an AF sensor and performs phase difference AF, so-called filed phase difference AF, can be performed.

For example, Japanese Unexamined Patent Application, First Publication No. 2010-185998 discloses an example in which focus detecting pixels are arranged in an arbitrary row in a horizontal direction in an imaging region. Through the focus detecting pixels, focus detection of a subject image that changes in brightness in the horizontal direction can be performed. Further, Japanese Unexamined Patent Application, First Publication No. 2010-185998 also discloses an example in which focus detecting pixels are arranged in an arbitrary column in a vertical direction in the imaging region. Through the focus detecting pixels, focus detection of a subject image that changes in brightness in the vertical direction can be performed.

Further, Japanese Unexamined Patent Application, First Publication No. 2010-185998 also discloses a technique in which an imaging device reads focus detection signals from the focus detecting pixels arranged in the imaging region of the solid-state imaging device. In the technique disclosed in Japanese Unexamined Patent Application, First Publication No. 2010-185998, the focus detection signals are read from the focus detecting pixels during a vertical blanking period of time rather than a period of time during which the solid-state imaging device outputs the imaging signals. In the technique disclosed in Japanese Unexamined Patent Application, First Publication No. 2010-185998, the read focus detection signals are temporarily accumulated in a buffer equipped in a separating circuit that separates the imaging signals from the focus detection signals. The focus detection signals temporarily accumulated in the buffer are stored in a predetermined storage region of a dynamic random access memory (DRAM) equipped in the imaging device via a bus in the imaging device. When the focus detecting pixels are arranged at a plurality of positions in the imaging region, that is, when focus detection is performed at each of a plurality of positions, the focus detection signals of all positions are stored in the DRAM. Thereafter, in the technique disclosed in Japanese Unexamined Patent Application, First Publication No. 2010-185998, a phase difference calculation circuit that performs a correlation calculation between pixel columns and calculates a phase difference reads the focus detection signals stored in the DRAM. Further, a phase difference used to perform phase difference AF by the imaging device is calculated based on the read focus detection signals.

However, in the technique disclosed in Japanese Unexamined Patent Application, First Publication No. 2010-185998, the focus detection signals output from the focus detecting pixels are read using the vertical blanking period of time as described above. For this reason, when the solid-state imaging device operates at a high frame rate, it is difficult to secure a period of time necessary to read the focus detection signals. This is because as the frame rate of the solid-state imaging device increases, a period of time necessary to read the imaging signals is secured by reducing the vertical blanking period of time.

Further, in order to improve the focus detection accuracy in the imaging device, the density of the focus detecting pixels arranged in the imaging region of the solid-state imaging device should be increased. In other words, there are cases in which the number of focus detecting pixels arranged in the imaging region is increased. In this case, as the density of the focus detecting pixels arranged in the solid-state imaging device is increased, a long period of time is considered to be required for reading of the focus detection signals of the focus detecting pixels. Depending on the number of focus detecting pixels, it may be difficult to secure a period of time necessary to read the focus detection signals during the vertical blanking period of time.

A problem for securing a period of time necessary to read the focus detection signals can be solved by applying, for example, a technique disclosed in Japanese Unexamined Patent Application, First Publication No. 2011-17842, to an imaging device. In the technique disclosed in Japanese Unexamined Patent Application, First Publication No. 2011-17842, the focus detection signals are read together when the imaging signals are read from the solid-state imaging device. Techniques of separating the imaging signal from the focus detection signal through a separating circuit have been proposed. In the technique disclosed in Japanese Unexamined Patent Application, First Publication No. 2011-17842, the focus detection signals are not read during the vertical blanking period of time. For this reason, even when it is difficult to secure a period of time necessary to read the focus detection signals during the vertical blanking period of time as the frame rate of the solid-state imaging device increases or as the density of the focus detecting pixels increases, the focus detection signals can be read, and the problem related to securing a period of time to read the focus detection signals can be solved.

Meanwhile, a technique for solving the problem of improving the focus detection accuracy in the imaging device is disclosed, for example, in Japanese Unexamined Patent Application, First Publication No. 2010-152161. In the technique disclosed in Japanese Unexamined Patent Application, First Publication No. 2010-152161, the focus detecting pixels are arranged in a plurality of rows in the imaging region of the solid-state imaging device. The focus detection accuracy is improved by averaging the focus detection signals output from the respective focus detecting pixels and reducing an error related to arrangement positions of the focus detecting pixels in a subsequent calculation of a phase difference. In the solid-state imaging device disclosed in Japanese Unexamined Patent Application, First Publication No. 2010-152161, a set of focus detecting pixels are not arranged in the same row or column in the imaging region, and a set of focus detecting pixels are separately arranged in two adjacent rows or columns as in the solid-state imaging device disclosed in Japanese Unexamined Patent Application, First Publication No. 2010-185998.

FIGS. 10A, 10B, 10C, and 10D are timing charts illustrating an exemplary read timing at which focus detection signals are read from focus detecting pixels arranged in an imaging region of a solid-state imaging device according to a read technique of a related art. In FIGS. 10A, 10B, 10C, and 10D, at a timing synchronized with a horizontal synchronous signal HD, imaging signals and focus detection signals are read from respective pixels for each of rows of the imaging region of the solid-state imaging device, and only the focus detection signals separated by a separating circuit are stored in a storage region of a DRAM represented by a write address WADR. Thereafter, a timing at which a phase difference calculation circuit reads the focus detection signals stored in a storage region of the DRAM represented by a read address RADR in order to calculate a phase difference is illustrated.

FIG. 10A illustrates a timing of reading signals from pixels of the solid-state imaging device when a set of focus detecting pixels are arranged in the same row in the horizontal direction in the imaging region. FIG. 10B illustrates an example of a storage region of a DRAM in which the read focus detection signals are stored. FIG. 10C illustrates a timing of reading signals from pixels of the solid-state imaging device when a set of focus detecting pixels are arranged in the same column in the vertical direction in the imaging region, and FIG. 10D illustrates an example of a storage region of a DRAM in which the read focus detection signals are stored.

As can be seen from FIG. 10A, when a set of focus detecting pixels is arranged in the same row in the horizontal direction in the imaging region, a set of focus detection signals is consecutively included in the pixel signal read from the solid-state imaging device. Thus, the separating circuit can consecutively separate the focus detection signals from the read pixel signal and sequentially store the focus detection signals in consecutive storage regions in the DRAM. Due to this operation, the phase difference calculation circuit can sequentially read the focus detection signals stored in the consecutive storage regions in the DRAM consecutively and perform a calculation of a phase difference.

FIG. 10A illustrates pixel signals when 50 sets of focus detecting pixels, that is, 100 focus detecting pixels, are arranged at two positions in the same row. The separating circuit sequentially stores focus detection signals AF1 to AF100 and focus detection signals AF101 to AF200 read from respective focus detecting pixel groups in consecutive storage regions of the DRAM corresponding to write addresses WADR1 to WADR100 and write addresses WADR101 to WADR200. Accordingly, as can be seen from FIG. 10B, the focus detection signals AF1 to AF100 and the focus detection signals AF101 to AF200 are stored in the consecutive storage regions of the DRAM. Thereafter, the phase difference calculation circuit sequentially reads the focus detection signals AF1 to AF100 and the focus detection signals AF101 to AF200 stored in consecutive storage regions of the DRAM corresponding to read addresses RADR1 to RADR100 and read addresses RADR101 to RADR200, and performs a calculation of a phase difference.

As described above, when a set of focus detecting pixels are arranged in the same row in the horizontal direction in the imaging region, the separating circuit can consecutively store the focus detection signals separated from the pixel signals in the DRAM, and the phase difference calculation circuit can consecutively read the stored focus detection signals from the DRAM. Since such consecutive access to the DRAM can be performed through burst access of a DRAM, it is an efficient access technique from a point of view of a bus band of a DRAM in the imaging device.

However, as can be seen from FIG. 10C, when a set of focus detecting pixels are arranged in the same column in the vertical direction in the imaging region, that is, when a set of focus detecting pixels is arranged in different rows in the horizontal direction in the imaging region, a set of focus detection signals are separately included in the pixel signals read from the solid-state imaging device at timings synchronized with the different horizontal synchronous signals HD. For this reason, the separating circuit individually separates the focus detection signals from the pixel signals read at timings of the different horizontal synchronous signals HD, and stores the respective focus detection signals in separate storage regions of the DRAM. Due to this operation, the phase difference calculation circuit reads the respective focus detection signals stored in the separate storage regions of the DRAM, and performs a calculation of a phase difference.

FIG. 10C illustrates pixel signals when 50 sets of focus detecting pixels, that is, 100 focus detecting pixels, are arranged such that focus detecting pixels arranged in the same column are arranged at three positions (three columns) in the horizontal direction. The separating circuit sequentially stores the focus detection signals read from the respective focus detecting pixel groups for each of rows of the pixel signals in the consecutive storage regions of the DRAM corresponding to the write addresses WADR. More specifically, the separating circuit separates the focus detection signal AF1, the focus detection signal AF101, and the focus detection signal AF201 from the pixel signal of the first row, and sequentially stores the focus detection signal AF1, the focus detection signal AF101, and the focus detection signal AF201 in consecutive storage regions of the DRAM corresponding to write addresses WADR1 to WADR3. Further, the separating circuit separates the focus detection signal AF2, the focus detection signal AF102, and the focus detection signal AF202 from the pixel signal of the second row, and sequentially stores the focus detection signal AF2, the focus detection signal AF102, and the focus detection signal AF202 in consecutive storage regions of the DRAM corresponding to write addresses WADR4 to WADR6. Further, the separating circuit separates the focus detection signal AF3, the focus detection signal AF103, and the focus detection signal AF203 from the pixel signal of the third row, and sequentially stores the focus detection signal AF3, the focus detection signal AF103, and the focus detection signal AF203 in consecutive storage regions of the DRAM corresponding to write addresses WADR7 to WADR9.

Thus, as can be seen from FIG. 10D, a set of focus detection signals (for example, the focus detection signal AF1 and the focus detection signal AF2) is separately stored such that the focus detection signal AF1, the focus detection signal AF101, the focus detection signal AF201, the focus detection signal AF2, the focus detection signal AF102, the focus detection signal AF202, and the like are stored in the consecutive storage regions of the DRAM.

Thereafter, the phase difference calculation circuit reads a set of focus detection signals stored in the separate storage regions of the DRAM, and performs a calculation of a phase difference. More specifically, the phase difference calculation circuit reads the focus detection signal AF1, the focus detection signal AF2, and the focus detection signal AF3 stored in the storage regions corresponding to the read address RADR1, the read address RADR4, and the read address RADR7 to which the focus detecting pixels arranged in the first column are output, and performs a calculation of a phase difference. Further, the phase difference calculation circuit reads the focus detection signal AF101, the focus detection signal AF102, and the focus detection signal AF103 stored in the storage regions corresponding to the read address RADR2, the read address RADR5, and the read address RADR8 to which the focus detecting pixels arranged in the second column are output, and performs a calculation of a phase difference. Further, the phase difference calculation circuit reads the focus detection signal AF201, the focus detection signal AF202, and the focus detection signal AF203 stored in the storage regions corresponding to the read address RADR3, the read address RADR6, and the read address RADR9 to which the focus detecting pixels arranged in the third column are output, and performs a calculation of a phase difference.

SUMMARY OF THE INVENTION

According to a first aspect of the present invention, an imaging device includes a solid-state imaging device including focus detecting pixels which are arranged together in a region in which imaging pixels are arranged in a form of a two-dimensional (2D) matrix, and configured to output imaging signals according to subject light incident on the imaging pixels and focus detection signals according to a quantity of light incident on the focus detecting pixels as pixel signals, a separating unit configured to separate the imaging signals and the focus detection signals from the pixel signals output from the solid-state imaging device, to output the focus detection signals output from the focus detecting pixels included in a horizontal direction focus detecting pixel set in which two focus detecting pixels outputting the focus detection signals according to a quantity of light incident in different directions in a row direction in the region of the solid-state imaging device are arranged as a set as a horizontal direction focus detection signal, and to output the focus detection signals output from the focus detecting pixels included in a vertical direction focus detecting pixel set in which two focus detecting pixels outputting the focus detection signals according to a quantity of light incident in different directions in a column direction in the region of the solid-state imaging device are arranged as a set as a vertical direction focus detection signal, a horizontal direction focus detection processing unit configured to convert a format in which the horizontal direction focus detection signals separated by the separating unit are output from a format in which the focus detection signals included in the horizontal direction focus detection signal are output from the solid-state imaging device into a predetermined format, and then to output the horizontal direction focus detection signals, and a vertical direction focus detection processing unit configured to convert a format in which the vertical direction focus detection signals separated by the separating unit are output from a format in which the focus detection signals included in the vertical direction focus detection signal are output from the solid-state imaging device into a predetermined format, and then to output the vertical direction focus detection signals.

Further, according to a second aspect of the present invention, in the imaging device according to the first aspect, the horizontal direction focus detection processing unit and the vertical direction focus detection processing unit are configured to convert the format of the focus detection signals included in the horizontal direction focus detection signal separated by the separating unit and the format of the focus detection signals included in the vertical direction focus detection signal separated by the separating unit so that the horizontal direction focus detection signal and the vertical direction focus detection signal, which are converted into a format and output, have a predetermined same format.

Further, according to a third aspect of the present invention, in the imaging device according to the second aspect, the horizontal direction focus detection processing unit includes a horizontal direction holding unit configured to hold the input horizontal direction focus detection signals by a predetermined number used in a focus detection process, and the focus detection signals included in the horizontal direction focus detection signals input from the separating unit at different timings are held in the horizontal direction holding unit, and the focus detection signals held in the horizontal direction holding unit are sequentially output from a predetermined timing as the focus detection signals included in the horizontal direction focus detection signal which is converted in format and output.

Further, according to a fourth aspect of the present invention, in the imaging device according to the third aspect, the horizontal direction holding unit is configured to hold all the focus detection signals output from the focus detecting pixels of a row having the largest number of horizontal direction focus detecting pixel sets in the region of the solid-state imaging device.

Further, according to a fifth aspect of the present invention, in the imaging device according to the third or fourth aspect, the horizontal direction holding unit is configured to delimit and hold the focus detection signals output from the focus detecting pixels in units of a predetermined number and holds the focus detection signals.

Further, according to a sixth aspect of the present invention, in the imaging device according to the fourth or fifth aspect, the horizontal direction focus detection processing unit includes a horizontal direction adding unit configured to add the focus detection signals output from the corresponding focus detecting pixels included in the horizontal direction focus detecting pixel sets arranged in different rows, the horizontal direction holding unit is configured to hold the focus detection signals added by the horizontal direction adding unit, the horizontal direction adding unit is configured to add the focus detection signals held in the horizontal direction holding unit to the focus detection signals output from the corresponding focus detecting pixels and input through the separating unit, and the horizontal direction holding unit is configured to sequentially output the held focus detection signals as the focus detection signals included in the horizontal direction focus detection signal which is converted into a format and output for each horizontal direction focus detecting pixel group after all the focus detection signals output from the corresponding focus detecting pixel included in a horizontal direction focus detecting pixel group including horizontal direction focus detecting pixel sets arranged in the row direction are added through the horizontal direction adding unit.

Further, according to a seventh aspect of the present invention, in the imaging device according to any one of the second to sixth aspects, the vertical direction focus detection processing unit includes a vertical direction holding unit configured to hold the input vertical direction focus detection signals by a predetermined number used in a focus detection process, and the focus detection signals included in the vertical direction focus detection signals input from the separating unit at different timings are held in the vertical direction holding unit, and the focus detection signals held in the vertical direction holding unit are sequentially output from a predetermined timing as the focus detection signals included in the vertical direction focus detection signal which is converted in format and output.

Further, according to an eighth aspect of the present invention, in the imaging device according to the seventh aspect, the vertical direction holding unit is configured to hold all the focus detection signals output from the focus detecting pixels of a row having the largest number of vertical direction focus detecting pixel sets in the region of the solid-state imaging device.

Further, according to a ninth aspect of the present invention, in the imaging device according to the seventh or eighth aspect, the vertical direction holding unit is configured to delimit and hold the focus detection signals output from the focus detecting pixels in units of a predetermined number.

Further, according to a tenth aspect of the present invention, in the imaging device according to the eighth or ninth aspect, the vertical direction focus detection processing unit includes a vertical direction adding unit configured to add the focus detection signals output from the corresponding focus detecting pixels included in the vertical direction focus detecting pixel sets arranged in either or both of different columns and different rows, the vertical direction holding unit is configured to hold the focus detection signals added by the vertical direction adding unit, the vertical direction adding unit is configured to add the focus detection signals held in the vertical direction holding unit to the focus detection signals output from the corresponding focus detecting pixels and input through the separating unit, and the vertical direction holding unit is configured to sequentially output the held focus detection signals as the focus detection signals included in the vertical direction focus detection signal which is converted into a format and output for each vertical direction focus detecting pixel group after all the focus detection signals output from the corresponding focus detecting pixel included in a vertical direction focus detecting pixel group including vertical direction focus detecting pixel sets arranged in either or both of the row direction and the column direction are added through the vertical direction adding unit.

Further, according to an eleventh aspect of the present invention, in the imaging device according to the tenth aspect, the vertical direction focus detection processing unit includes the vertical direction holding units which are equal in number to the vertical direction focus detecting pixel groups arranged in the row direction in the region of the solid-state imaging device, and the vertical direction adding units which are equal in number to the vertical direction focus detecting pixel groups arranged in the row direction in the region of the solid-state imaging device, wherein the focus detection signals output from the focus detecting pixels included in the respective vertical direction focus detecting pixel groups are added by the vertical direction adding units corresponding to the respective vertical direction focus detecting pixel groups and all held in the corresponding vertical direction holding units, and then the focus detection signals held in the respective vertical direction holding units are sequentially output as the focus detection signals included in the vertical direction focus detection signal which is converted in format and output for each vertical direction holding unit.

Further, according to a twelfth aspect of the present invention, in the imaging device according to the tenth aspect, the vertical direction focus detection processing unit includes the vertical direction holding units which are equal in number to the vertical direction focus detecting pixel groups arranged in the row direction in the region of the solid-state imaging device, and a vertical direction adding unit shared by all the vertical direction holding units, the focus detection signals output from the focus detecting pixels included in the respective vertical direction focus detecting pixel groups are added for each of the vertical direction focus detecting pixel groups through the vertical direction adding unit and all held in the corresponding respective vertical direction holding units, and then the focus detection signals held in the respective vertical direction holding units are sequentially output as the focus detection signals included in the vertical direction focus detection signal which is converted in format and output for each vertical direction holding unit.

Further, according to a thirteenth aspect of the present invention, in the imaging device according to the tenth aspect, the vertical direction holding unit is configured such that a holding region of one holding unit is divided into divisional holding regions which are equal in number to the vertical direction focus detecting pixel groups arranged in the row direction in the region of the solid-state imaging device, and the focus detection signals output from the focus detecting pixels included in the respective vertical direction focus detecting pixel groups are added through the vertical direction adding units corresponding to the respective vertical direction focus detecting pixel groups and all held in the corresponding respective divisional holding regions, and then the focus detection signals held in the respective divisional holding regions are sequentially output as the focus detection signals included in the vertical direction focus detection signal which is converted in format and output for each divisional holding region.

Further, according to a fourteenth aspect of the present invention, in the imaging device according to the thirteenth aspect, the vertical direction holding unit is configured such that the holding region of one holding unit is divided into divisional holding regions having a size by which all the focus detection signals output from the focus detecting pixels of a column having the largest number of vertical direction focus detecting pixel sets are held in the region of the solid-state imaging device.

Further, according to a fifteenth aspect of the present invention, in the imaging device according to any one of the tenth to thirteenth aspects, the vertical direction holding unit is configured such that the holding region of one holding unit is divided into divisional holding regions having a size by which the focus detection signals output from the focus detecting pixels are delimited in units of a predetermined number.

BRIEF DESCRIPTION OF THE DRAWINGS

FIG. 3A is a timing chart illustrating an exemplary operation timing of the horizontal direction focus detection processing circuit equipped in the imaging device according to the present embodiment;

FIG. 3B is a timing chart illustrating an exemplary operation timing of the horizontal direction focus detection processing circuit equipped in the imaging device according to the present embodiment;

FIG. 5 is a timing chart illustrating another exemplary operation timing of the horizontal direction focus detection processing circuit equipped in the imaging device according to the present embodiment;

FIG. 7A is a timing chart illustrating an exemplary operation timing of the vertical direction focus detection processing circuit equipped in the imaging device according to the present embodiment;

FIG. 7B is a timing chart illustrating an exemplary operation timing of the vertical direction focus detection processing circuit equipped in the imaging device according to the present embodiment;

FIG. 9A is a timing chart illustrating another exemplary operation timing of the vertical direction focus detection processing circuit equipped in the imaging device according to the present embodiment;

FIG. 9B is a timing chart illustrating another exemplary operation timing of the vertical direction focus detection processing circuit equipped in the imaging device according to the present embodiment;

FIG. 10A is a timing chart illustrating an exemplary reading timing of focus detection signals from focus detecting pixels arranged in an imaging region of a solid-state imaging device according to a reading method of a related art;

FIG. 10B is a timing chart illustrating an exemplary reading timing of the focus detection signals from the focus detecting pixels arranged in the imaging region of the solid-state imaging device according to the reading method of the related art;

FIG. 10C is a timing chart illustrating an exemplary reading timing of the focus detection signals from the focus detecting pixels arranged in the imaging region of the solid-state imaging device according to the reading method of the related art; and FIG. 10D is a timing chart illustrating an exemplary reading timing of the focus detection signals from the focus detecting pixels arranged in the imaging region of the solid-state imaging device according to the reading method of the related art.

DETAILED DESCRIPTION OF THE INVENTION

Figure 1:
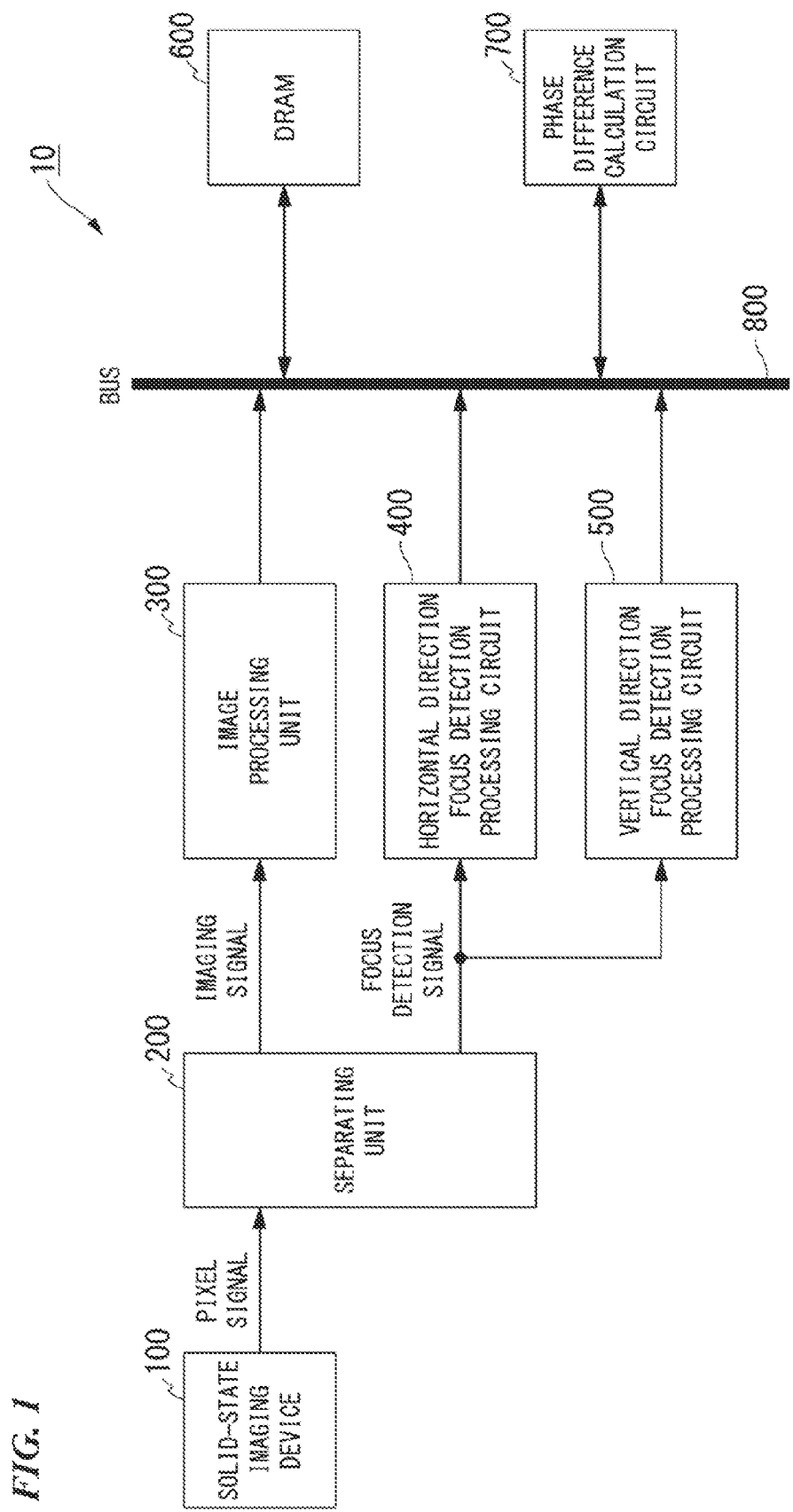
FIG. 1 is a block diagram illustrating a schematic constitution of an imaging device according to an embodiment of the present invention.

Hereinafter, an embodiment of the present invention will be described with reference to the appended drawings. FIG. 1 is a block diagram illustrating a schematic constitution of an imaging device according to the present embodiment. Referring to FIG. 1, an imaging device 10 includes a solid-state imaging device 100, a separating unit 200, an image processing unit 300, a horizontal direction focus detection processing circuit 400, a vertical direction focus detection processing circuit 500, a DRAM 600, and a phase difference calculation circuit 700. In the imaging device 10, the image processing unit 300, the horizontal direction focus detection processing circuit 400, the vertical direction focus detection processing circuit 500, the DRAM 600, and the phase difference calculation circuit 700 are connected to one another via a bus 800, and for example, an operation of writing data to the DRAM 600 and an operation of reading data from the DRAM 600 are performed through direct memory access (DMA).

FIG. 1 focuses on components for implementing an AF function of the imaging device 10 based on pixel signals output from the solid-state imaging device 100 among components equipped in the imaging device 10. Only components that operate when data according to a pixel signal acquired from the solid-state imaging device 100 is transferred (written) to the DRAM 600 and components that perform a process of implementing an AF function based on data stored in the DRAM 600 are illustrated. In other words, in addition to the components illustrated in FIG. 1, similarly to the imaging device of the related art, the imaging device 10 includes components such as a display processing unit that performs control for causing image data to be displayed on a display device, an interface (IF) unit that performs control for causing image data to be recorded in a recording medium, and a central processing unit (CPU) that controls the imaging device 10 in general, but such components are not illustrated in FIG. 1. The components equipped in the imaging device 10 other than the components illustrated in FIG. 1 and operations of the components are similar to those of the imaging device of the related art. A detailed description of the components other than the components illustrated in FIG. 1 and operations of the components will be omitted.

The solid-state imaging device 100 includes an image sensor that performs photoelectric conversion on an optical image of a subject formed by a lens (not shown) such as a complementary metal-oxide semiconductor (CMOS) image sensor. In the solid-state imaging device 100, pixels for imaging that output pixel signals obtained by performing photoelectric conversion on an optical image of an imaged subject as imaging signals and either the left side or the right side are light-shielded in a region (hereinafter referred to as an "imaging region") of pixels for imaging incident subject light. Further, pixels for focus detection that output pixel signals representing a quantity of light of the left or right side of a captured subject as focus detection signals are arranged together.

In the following description, a pixel for imaging is referred to as an "imaging pixel," and a pixel for focus detection is referred to as a "focus detecting pixel." Further in the following description, when an imaging pixel is not distinguished from a focus detecting pixel, it is referred to simply as a "pixel," and when an imaging signal output from an imaging pixel is not distinguished from a focus detection signal output from a focus detecting pixel, it is referred to as a "pixel signal."

The solid-state imaging device 100 outputs all pixel signals output from pixels arranged in the imaging region, that is, pixel signals in the entire imaging region in which a plurality of pixels arranged in the form of a two-dimensional (2D) matrix perform imaging of subject light to the separating unit 200 in a raster order.

The separating unit 200 separates an imaging signal and a focus detection signal from each of the pixel signals input from the solid-state imaging device 100 in a raster order. In the solid-state imaging device 100, the position of the focus detecting pixel arranged in the imaging region is registered in advance. In other words, since the position at which the focus detecting pixel is arranged is detected in advance, the separating unit 200 determines whether the pixel signal input from the solid-state imaging device 100 is the imaging signal or the focus detection signal based on the position at which the focus detecting pixel is arranged, and separates the imaging signal and the focus detection signal from of the pixel signal.

The separating unit 200 outputs the image signal separated from the pixel signal to the image processing unit 300, and outputs the focus detection signal to the horizontal direction focus detection processing circuit 400 and the vertical direction focus detection processing circuit 500. When the focus detecting pixels are arranged in the horizontal direction and the vertical direction in the imaging region of the solid-state imaging device 100, the focus detection signal output from the focus detecting pixel arranged in the horizontal direction may be output to the horizontal direction focus detection processing circuit 400, and the focus detection signal output from the focus detecting pixel arranged in the vertical direction may be output to the vertical direction focus detection processing circuit 500.

The image processing unit 300 performs predetermined image processing on the image signal input from the separating unit 200 to generate image data, and causes the generated image data to be stored in a predetermined storage region of the DRAM 600 via the bus 800. The image processing unit 300 performs various image processing such as YC conversion processing, noise cancellation processing, distortion correction processing, scratch correction processing, and image compression processing on the input imaging signal. However, various image processing performed by the image processing unit 300 is similar to processing in the imaging device of the related art, and thus a detailed description thereof will be omitted.

The horizontal direction focus detection processing circuit 400 converts a format of the focus detection signal input from the separating unit 200 into a predetermined focus detection signal format to be performed by the phase difference calculation circuit 700, sequentially outputs the focus detection signals of the converted format to the DRAM 600 via the bus 800, and causes the focus detection signals of the converted format to be stored in a predetermined storage region of the DRAM 600. A detailed description related to format conversion of the focus detection signal performed by the horizontal direction focus detection processing circuit 400 will be described later.

The vertical direction focus detection processing circuit 500 converts a format of the focus detection signal input from the separating unit 200 into a predetermined focus detection signal format to be performed by the phase difference calculation circuit 700, sequentially outputs the focus detection signals of the converted format to the DRAM 600 via the bus 800, and causes the focus detection signals of the converted format to be stored in a predetermined storage region of the DRAM 600. A detailed description related to format conversion of the focus detection signal performed by the vertical direction focus detection processing circuit 500 will be provided later.

The horizontal direction focus detection processing circuit 400 and the vertical direction focus detection processing circuit 500 perform formation conversion so that the focus detection signals of various formats output from the solid-state imaging device 100 have the same storage format. Through this operation, in the imaging device 10 according to the present embodiment, the focus detection signal of the same format is stored in the DRAM 600 regardless of the format of the focus detection signal input from the solid-state imaging device 100.

The DRAM 600 stores the image data and the focus detection signal transferred from the image processing unit 300, the horizontal direction focus detection processing circuit 400, and the vertical direction focus detection processing circuit 500 via the bus 800. Further, the DRAM 600 stores various data in the processing processes of the respective components equipped in the imaging device 10. As described above, in the imaging device 10, an operation of writing data in the DRAM 600 and an operation of reading data from the DRAM 600 are performed through the DMA. Thus, in the DRAM 600, a DRAM controller (not shown) adjusts access requests (DMA access requests) from a plurality of components which are connected to one another via the bus 800 in the imaging device 10 and controls data transfer (writing) to the DRAM 600 and data acquisition (reading) from the DRAM 600.

The phase difference calculation circuit 700 reads the focus detection signal stored in the DRAM 600 via the bus 800, generates an evaluation value for phase difference AF using the read focus detection signal, and stores the generated evaluation value for phase difference AF in a predetermined storage region of the DRAM 600 again via the bus 800. For example, the phase difference calculation circuit 700 performs a correlation calculation of the focus detecting pixels between pixels based on the read focus detection signal, and generates the evaluation value for phase difference AF. However, a method of calculating the evaluation value for phase difference AF in the phase difference calculation circuit 700 is similar to a method of calculating a phase difference in a phase difference calculation circuit equipped in the imaging device of the related art, and thus a detailed description thereof will be omitted.

Through this constitution, the imaging device 10 controls the position of the focus lens among lenses (not shown) based on information of the phase difference obtained from the focus detection signals output from the focus detecting pixels arranged in the imaging region of the solid-state imaging device 100, and performs an AF function (phase difference AF) identical to that of the imaging device that includes an AF sensor and performs phase difference AF.

The imaging device according 10 to the present embodiment is configured to store the information of the phase difference obtained as a result of calculation performed by the phase difference calculation circuit 700 in a predetermined storage region of the DRAM 600. However, a method of outputting the information of the phase difference performed by the phase difference calculation circuit 700 is not limited to a method performed by the above constitution. For example, the information of the phase difference performed by the phase difference calculation circuit 700 may be output directly to a lens control unit that drives the focus lens among lenses (not shown) or a control unit that controls the imaging device 10 in general.

Figure 2A:
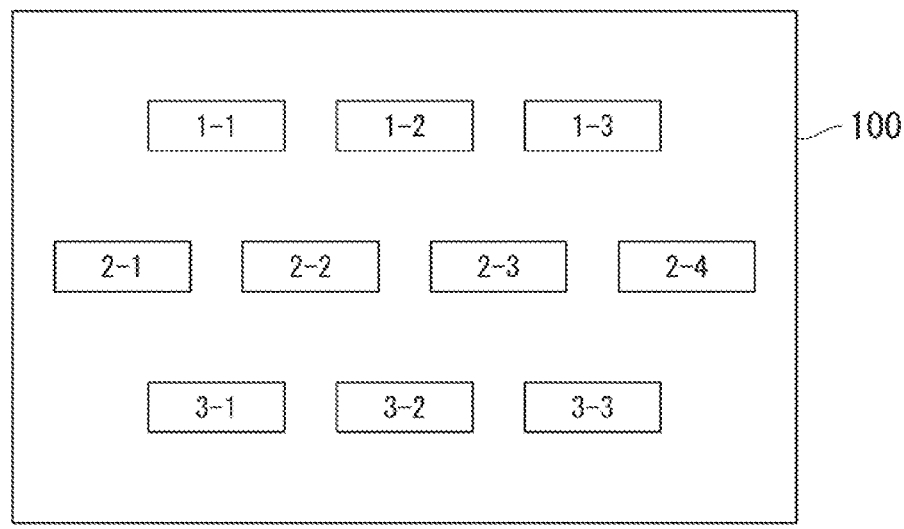
FIG. 2A is a diagram for describing a constitution of a horizontal direction focus detection processing circuit equipped in an imaging device according to the present embodiment.
Figure 2B:
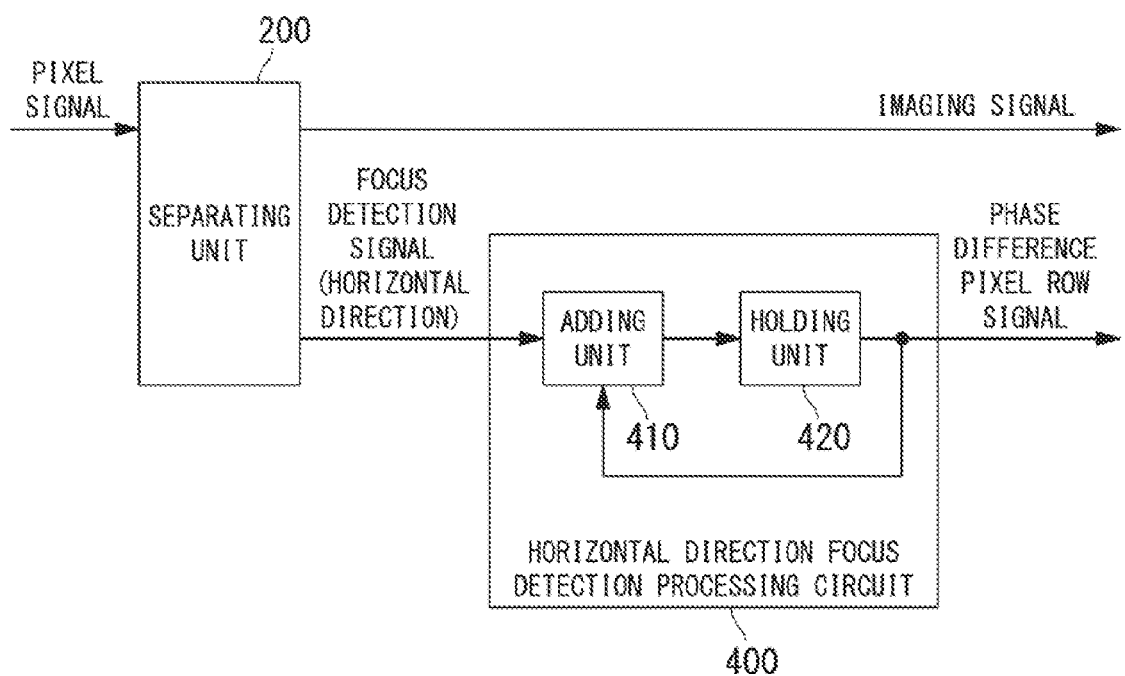
FIG. 2B is a diagram for describing a constitution of a horizontal direction focus detection processing circuit equipped in an imaging device according to the present embodiment.

Next, format conversion of the focus detection signal in the imaging device 10 will be described. First of all, an example in which the focus detecting pixels are arranged in the imaging region of the solid-state imaging device 100 will be described. FIGS. 2A and 2B are diagrams for describing a constitution of the horizontal direction focus detection processing circuit 400 equipped in the imaging device according 10 to the present embodiment. FIG. 2A illustrates an exemplary arrangement of focus detecting pixels in the imaging region in the solid-state imaging device 100 corresponding to the horizontal direction focus detection processing circuit 400. FIG. 2B is a block diagram illustrating the horizontal direction focus detection processing circuit 400. FIG. 2B also illustrates the separating unit 200 that separates the focus detection signals in the horizontal direction output from the focus detecting pixels arranged in the horizontal direction in the imaging region from the pixel signal input from the solid-state imaging device 100, and outputs the separated focus detection signals to the horizontal direction focus detection processing circuit 400.

The following description will proceed under the assumption that the right side is light-shielded, and the focus detecting pixels that output the focus detection signals representing a quantity of light of the left side of a captured subject and the left side are light-shielded as illustrated in FIG. 2A. Further, the description will proceed in connection with an example in which a plurality of focus detecting pixel groups (focus detecting pixel group 1-1 to focus detecting pixel group 3-3), each of which is a set of focus detecting pixels that output the focus detection signals representing a quantity of light of the right side of a captured subject, are arranged at a plurality of positions in the horizontal direction in the imaging region of the solid-state imaging device 100. Each focus detecting pixel group is assumed to include 50 sets of focus detecting pixels, that is, 100 focus detecting pixels.

The horizontal direction focus detection processing circuit 400 includes an adding unit 410 and a holding unit 420 as illustrated in FIG. 2B. The holding unit 420 is a memory that holds the focus detection signals input from the adding unit 410 such as a static random access memory (SRAM). The memory size of the holding unit 420 is a maximum size by which all of the focus detection signals output from the focus detecting pixels arranged in the same row in the imaging region of the solid-state imaging device 100 can be held. More specifically, in the arrangement of the focus detecting pixels illustrated in FIG. 2A, a row in which four focus detecting pixels, that is, the focus detecting pixel group 2-1, 2-2, 2-3, and 2-4, are arranged is a row in which the largest number of focus detection signals are output. Thus, the holding unit 420 has the memory size by which the focus detection signal of 400 pixels (=100 pixels×4 groups).

The adding unit 410 adds a previous focus detection signal held in the holding unit 420 to the current focus detection signal input from the separating unit 200, and outputs the added focus detection signal to the holding unit 420. When the format of the focus detection signal stored in the DRAM 600 is a format in which the focus detection signals are added, the adding unit 410 adds the focus detection signals output from the respective focus detecting pixels included in the respective focus detecting pixel groups, and outputs the added focus detection signal to the holding unit 420. However, when the format of the focus detection signal stored in the DRAM 600 is a format in which the focus detection signals are not added, the adding unit 410 outputs the focus detection signals input from the separating unit 200 to the holding unit 420 with no change and without adding the focus detection signals.

More specifically, when the format of the focus detection signal stored in the DRAM 600 is a format in which the focus detection signals output from the focus detecting pixels arranged over a plurality of rows in the same focus detecting pixel group are added, the horizontal direction focus detection processing circuit 400 operates as follows. First of all, the holding unit 420 outputs the focus detection signal which is currently held in the holding region, corresponding to the current focus detection signal input from the separating unit 200, that is, the previous focus detection signal to be added to the current focus detection signal input from the separating unit 200 through the adding unit 410 to the adding unit 410. Then, the adding unit 410 adds the current focus detection signal input from the separating unit 200 to the corresponding previous focus detection signal output from the holding unit 420, and outputs the added focus detection signal to the holding unit 420. Then, the holding unit 420 overwrites the added focus detection signal input from the adding unit 410 in the holding region that holds the output previous focus detection signal.

Then, the holding unit 420 causes the held focus detection signal to be stored in a predetermined storage region of the DRAM 600, for example, through burst access each time an output of the pixel signals of the focus detecting pixel group from the solid-state imaging device 100 is completed, that is, each time an input of as many focus detection signals as the number of rows included in the focus detecting pixel group from the separating unit 200 ends.

Further, when the format of the focus detection signal stored in the DRAM 600 is the format in which the focus detection signals output from the respective focus detecting pixels in the focus detecting pixel group are stored with no change, that is, the formation in which the addition is not performed, the horizontal direction focus detection processing circuit 400 operates as follows. First of all, the adding unit 410 outputs the current focus detection signal input from the separating unit 200 to the holding unit 420 with no change. Then, the holding unit 420 holds the current focus detection signals input from the adding unit 410 in the holding region corresponding to the current focus detection signals input from the separating unit 200.

Then, the holding unit 420 causes the held focus detection signals to be stored in a predetermined storage region of the DRAM 600, for example, through burst access as the phase difference pixel row signals each time an output of the pixel signals of one row from the solid-state imaging device 100 is completed, that is, each time an input of the focus detection signals of one row from the separating unit 200 ends.

As described above, the horizontal direction focus detection processing circuit 400 performs conversion to the same format for each focus detecting pixel group and then causes the phase difference pixel row signal to be stored in a predetermined storage region of the DRAM 600 even when the focus detecting pixel group is composed of a plurality of focus detecting pixels arranged in a plurality of rows in the imaging region as well as when the focus detecting pixel group is composed of a plurality of focus detecting pixels of one row in the imaging region. Through this operation, the phase difference pixel row signals corresponding to the focus detecting pixel 1-1 to the focus detecting pixel 3-3 are consecutively stored in a predetermined storage region of the DRAM 600. As described above, in the horizontal direction focus detection processing circuit 400, even when the focus detection signals input from the solid-state imaging device 100 differ in format due to the difference in the arrangement of the focus detecting pixels included in the focus detecting pixel group, it is possible to cause the phase difference pixel row signals of the same format to be stored in the DRAM 600.

Here, an exemplary operation of the horizontal direction focus detection processing circuit 400 will be described. FIGS. 3A and 3B are timing charts illustrating an exemplary operation timing of the horizontal direction focus detection processing circuit 400 equipped in the imaging device according 10 to the present embodiment. The timing charts illustrated in FIGS. 3A and 3B are timing charts when a set of focus detecting pixels are arranged in the same row in the horizontal direction in the imaging region. FIG. 3A illustrates a timing when, in the solid-state imaging device 100 in which 50 sets of focus detecting pixels, that is, 100 focus detecting pixels, are arranged at two positions in the same row as the focus detecting pixel group, the focus detection signals output from the respective focus detecting pixels included in each focus detecting pixel group are stored in the DRAM 600 in the format in which the focus detection signals are stored with no change. FIG. 3B illustrates an exemplary storage region of the DRAM 600 in which the phase difference pixel row signals are stored through the horizontal direction focus detection processing circuit 400.

In the format in which the focus detection signals output from the respective focus detecting pixels included in the focus detecting pixel group are stored in the DRAM 600 as the phase difference pixel row signals with no change, the adding unit 410 the focus detection signals input from the separating unit 200 to the holding unit 420 with no change, and thus in FIG. 3A, a timing at which the adding unit 410 operates is omitted.

The solid-state imaging device 100 outputs the pixel signals from the respective pixels to the separating unit 200 in units of rows in the imaging region at a timing synchronized with the horizontal synchronous signal HD, similarly to a signal reading timing of the solid-state imaging device illustrated in FIG. 10A. As can be seen from FIG. 3A, when a set of focus detecting pixels are arranged in the same row in the horizontal direction in the imaging region, respective sets of focus detection signals (the focus detection signals AF1 to AF100 and the focus detection signals AF101 to AF200) are consecutively included in the pixel signal read from the solid-state imaging device 100.

The separating unit 200 outputs the focus detection signals AF1 to AF100 and the focus detection signals AF101 to AF200 which are consecutively separated from the pixel signal input from the solid-state imaging device 100 to the adding unit 410 of the horizontal direction focus detection processing circuit 400. Then, the adding unit 410 outputs the focus detection signals input from the separating unit 200 to the holding unit 420 with no change.

The holding unit 420 sequentially holds the focus detection signals input from the adding unit 410, that is, the focus detection signals AF1 to AF100 and the focus detection signals AF101 to AF200 input from the separating unit 200, to the corresponding holding regions. In FIG. 3A, the focus detection signals AF1 to AF100 are held in the holding regions represented by consecutive write addresses WA1 to WA100, and the focus detection signals AF101 to AF200 are held in the holding regions represented by consecutive write addresses WA101 to WA200.

Then, after an output of the pixel signals of one row from the solid-state imaging device 100 is completed, the holding unit 420 sequentially reads the focus detection signals AF1 to AF100 and the focus detection signals AF101 to AF200 held in the respective holding regions, and causes the read focus detection signals to be sequentially stored in a predetermined storage region of the DRAM 600 as the phase difference pixel row signals. In FIG. 3A, the focus detection signals AF1 to AF100 and the focus detection signals AF101 to AF200 held in the respective holding regions represented by read addresses RA1 to RA100 and read addresses RA101 to RA200 are sequentially read, and the read focus detection signals are sequentially stored in the consecutive storage regions of the DRAM 600 corresponding to the consecutive write addresses WADR1 to WADR100 and the write addresses WADR101 to WADR200. Through this operation, the focus detection signals AF1 to AF200 are stored in the consecutive storage regions of the DRAM 600 corresponding to the write addresses WADR1 to 200 as illustrated in FIG. 3B.

Through this operation, the phase difference calculation circuit 700 can sequentially read the focus detection signals AF1 to AF100 and the focus detection signals AF101 to AF200 stored in the consecutive storage regions of the DRAM 600 corresponding to the read addresses RADR1 to RADR100 and the read addresses RADR101 to RADR200, and performs a calculation of a phase difference based on the focus detection signals output from each focus detecting pixel group.

Next, another exemplary operation of the horizontal direction focus detection processing circuit 400 will be described. An operation of the horizontal direction focus detection processing circuit 400 which will be described below is an operation of the horizontal direction focus detection processing circuit 400 when the format of the focus detection signal stored in the DRAM 600 is the format in which the focus detection signals output from the focus detecting pixels arranged over a plurality of rows in the same focus detecting pixel group are added.

Figure 4A:
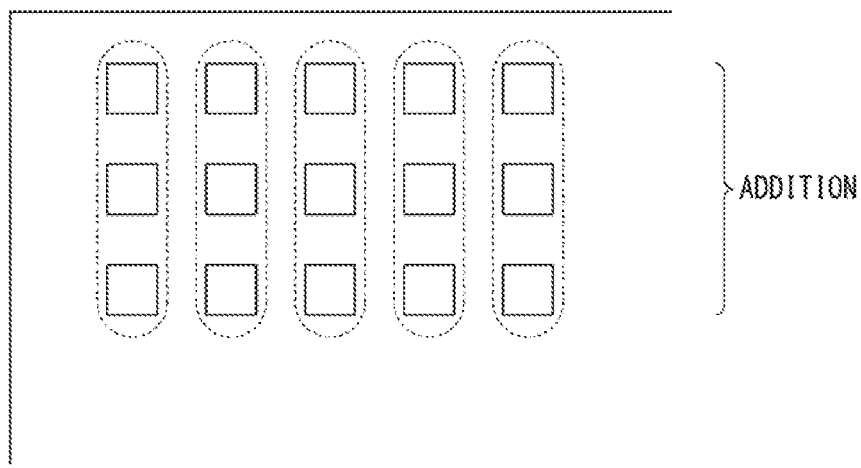
FIG. 4A is a diagram for describing a method of adding focus detection signals through a horizontal direction focus detection processing circuit equipped in the imaging device according to the present embodiment.
Figure 4B:
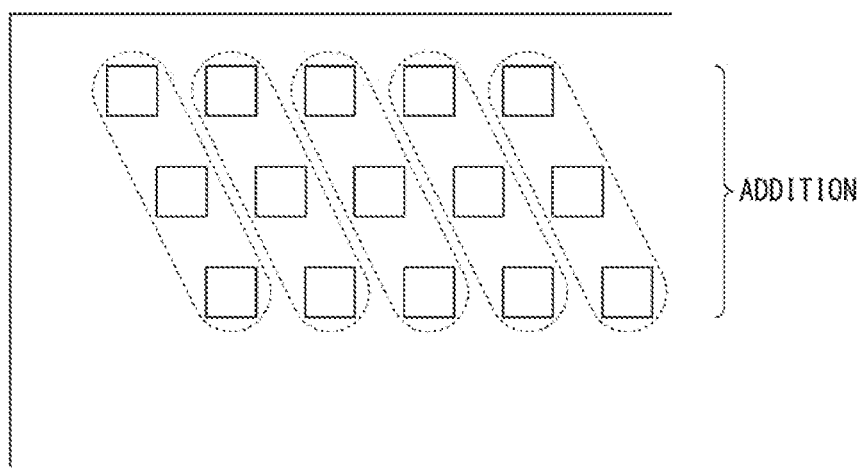
FIG. 4B is a diagram for describing a method of adding focus detection signals through the horizontal direction focus detection processing circuit equipped in the imaging device according to the present embodiment.

First of all, an operation of adding the focus detection signals through the horizontal direction focus detection processing circuit 400 will be described. FIGS. 4A and 4B are diagrams for describing a method of adding the focus detection signals through the horizontal direction focus detection processing circuit 400 equipped in the imaging device according 10 to the present embodiment. As illustrated in FIG. 4A, the focus detecting pixels that output the focus detection signals to be added by the horizontal direction focus detection processing circuit 400 are assumed to be arranged over three rows in the imaging region of the solid-state imaging device 100. In this case, the horizontal direction focus detection processing circuit 400 adds the focus detection signals output from the three focus detecting pixels which are arranged in the same column in the vertical direction and surrounded by a dotted line in FIG. 4A, and stores a single focus detection signal in the DRAM 600 as the addition result. In other words, in the arrangement of the focus detecting pixels illustrated in FIG. 4A, the horizontal direction focus detection processing circuit 400 causes each of five focus detection signals, each of which is obtained by adding the focus detection signals of the three rows, to be stored in a predetermined storage region of the DRAM 600 as the phase difference pixel row signal.

An arrangement of the focus detecting pixels supported by the horizontal direction focus detection processing circuit 400 is not limited to only addition of the focus detection signals output from the focus detecting pixels arranged in the same column in the vertical direction as in the arrangement illustrated in FIG. 4A. For example, as illustrated in FIG. 4B, the focus detection signals output from the respective focus detecting pixels arranged in different columns may be added and stored in a predetermined storage region of the DRAM 600 as the phase difference pixel row signal. In this case, the horizontal direction focus detection processing circuit 400 adds the focus detection signals output from the three focus detecting pixels which are arranged in different columns and surrounded by a dotted line in FIG. 4B, and stores a single focus detection signal in the DRAM 600 as the addition result. In other words, in the arrangement of the focus detecting pixels illustrated in FIG. 4B, the horizontal direction focus detection processing circuit 400 causes each of five focus detection signals, each of which is obtained by adding the focus detection signals of the three rows in different columns, to be stored in a predetermined storage region of the DRAM 600 as the phase difference pixel row signal.

Next, an exemplary operation of adding the focus detection signals through the horizontal direction focus detection processing circuit 400 will be described. FIG. 5 is a timing chart illustrating another exemplary operation timing of the horizontal direction focus detection processing circuit 400 equipped in the imaging device according 10 to the present embodiment. The timing chart illustrated in FIG. 5 is a timing chart of the solid-state imaging device 100 having the constitution illustrated in FIG. 4A in which a set of focus detecting pixels are arranged in the same row in the horizontal direction in the imaging region, the focus detecting pixels that output the focus detection signals to be added in the same focus detecting pixel group are arranged over a plurality of rows. FIG. 5 illustrates a timing when, in the solid-state imaging device 100 in which 50 sets of focus detecting pixels, that is, 100 focus detecting pixels, are arranged at two positions in the same row as the focus detecting pixel group, and the focus detecting pixels that output the focus detection signals to be added are arranged over three rows, the focus detection signals output from the focus detecting pixels of the three rows in each focus detecting pixel group are stored in the DRAM 600 in the format in which the focus detection signals are added and stored.

In the format in which the focus detection signals output from the respective focus detecting pixel included in the focus detecting pixel group are added and stored in the DRAM 600 as the phase difference pixel row signal, the adding unit 410 adds the previous focus detection signal held in the holding unit 420 to the current focus detection signal input from the separating unit 200, and outputs the added focus detection signal to the holding unit 420. In FIG. 5, the addition operation of the adding unit 410 is represented by the writing operation and the reading operation of the holding region of the holding unit 420.

The solid-state imaging device 100 outputs the pixel signals from the respective pixels to the separating unit 200 in units of rows in the imaging region at a timing synchronized with the horizontal synchronous signal HD, similarly to a reading timing of the pixel signal in the solid-state imaging device 100 illustrated in FIG. 3A. However, as can be seen from FIG. 5, in the solid-state imaging device 100, since the focus detecting pixels that output the focus detection signals to be added are arranged over three rows, a set of focus detection signals is consecutively included in the pixel signals of the three rows read from the solid-state imaging device 100.

The separating unit 200 sequentially outputs the consecutive focus detection signals of each row separated from the input pixel signal to the adding unit 410 of the horizontal direction focus detection processing circuit 400 each time the pixel signals of each row are input from the solid-state imaging device 100.

When the focus detection signals of the first row are input from the separating unit 200, the adding unit 410 outputs the input focus detection signals to the holding unit 420 with no change. At this time, the holding unit 420 sequentially holds the respective focus detection signals which are input from the adding unit 410, that is, the focus detection signals which are input from the separating unit 200, in the corresponding holding regions, similarly to the operation timing of the holding unit 420 illustrated in FIG. 3A. In, FIG. 5, the respective focus detection signals output from 100 focus detecting pixels included in the first focus detecting pixel group are held in the holding regions represented by consecutive write addresses WA1 to WA100, and the respective focus detection signals output from 100 focus detecting pixels included in the second focus detecting pixel group are held in the holding regions represented by consecutive write addresses WA101 to WA200.

Thereafter, when the focus detection signals of the second row are input from the separating unit 200, the holding unit 420 outputs the focus detection signals of the first row which are currently held in the holding regions and correspond to the focus detection signals of the second row input from the separating unit 200 to the adding unit 410. The adding unit 410 adds the focus detection signals of the second row input from the separating unit 200 to the corresponding focus detection signals of the first row output from the holding unit 420, and outputs the added focus detection signals to the holding unit 420 as the new focus detection signals. Then, the holding unit 420 sequentially overwrites and holds the respective new focus detection signals input from the adding unit 410 in the holding regions in which the corresponding focus detection signals of the first row are held. In FIG. 5, the focus detection signals of the first row which are output from the 100 focus detecting pixels included in the first focus detecting pixel group and held in the holding regions represented by consecutive read addresses RA1 to RA100 are sequentially read, and the focus detection signals of the first and second rows input from the adding unit 410 are overwritten and held in the holding regions represented by the consecutive write addresses WA1 to WA100. Further, in FIG. 5, the focus detection signals of the first row which are output from the 100 focus detecting pixels included in the second focus detecting pixel group and held in the holding regions represented by consecutive read addresses RA101 to RA200 are sequentially read, and the focus detection signals of the first and second rows input from the adding unit 410 are overwritten and held in the holding regions represented by the consecutive write addresses WA101 to WA200.

Similarly, when the focus detection signals of the third row are input from the separating unit 200, the holding unit 420 outputs the focus detection signals of the first and second rows which are currently held in the holding regions and correspond to the focus detection signals of the third row input from the separating unit 200 to the adding unit 410. The adding unit 410 adds the focus detection signals of the third row input from the separating unit 200 to the corresponding focus detection signals of the first and second rows output from the holding unit 420, and outputs the added focus detection signals to the holding unit 420 as the new focus detection signals. Then, the holding unit 420 sequentially overwrites and holds the respective new focus detection signals input from the adding unit 410 in the holding regions in which the corresponding focus detection signals of the first and second rows are held. In FIG. 5, the focus detection signals of the first and second rows which are output from the 100 focus detecting pixels included in the first focus detecting pixel group and held in the holding regions represented by the consecutive read addresses RA1 to RA100 are sequentially read, and the focus detection signals of the first to third rows input from the adding unit 410 are overwritten and held in the holding regions represented by the consecutive write addresses WA1 to WA100. Further, in FIG. 5, the focus detection signals of the first and second rows which are output from the 100 focus detecting pixels included in the second focus detecting pixel group and held in the holding regions represented by the consecutive read addresses RA101 to RA200 are sequentially read, and the focus detection signals of the first to third rows input from the adding unit 410 are overwritten and held in the holding regions represented by the consecutive write addresses WA101 to WA200.

Then, after an input of the pixel signals of the three rows from the solid-state imaging device 100 is completed, the holding unit 420 sequentially reads the focus detection signals of the first to third rows held in the respective holding regions, and sequentially stores the focus detection signals of the first to third rows in a predetermined storage region of the DRAM 600 as the phase difference pixel row signals. In FIG. 5, the 100 focus detection signals of the first focus detecting pixel group held in the holding regions represented by the consecutive read addresses RA1 to RA100 are sequentially read and sequentially stored in the consecutive storage regions of the DRAM 600 corresponding to the consecutive write addresses WADR1 to WADR100. Further, in FIG. 5, thereafter, the 100 focus detection signals of the second focus detecting pixel group held in the holding regions represented by the consecutive read addresses RA101 to RA200 are sequentially read and sequentially stored in the consecutive storage regions of the DRAM 600 corresponding to the consecutive write addresses WADR101 to WADR200.

As described above, the respective added focus detection signals are sequentially stored in the storage regions of the DRAM 600 corresponding to the consecutive write addresses WADR1 to WADR200. At this time, the status of the storage region of the DRAM 600 after the phase difference pixel row signals are stored by the horizontal direction focus detection processing circuit 400 is identical to the status of the storage region of the DRAM 600 illustrated in FIG. 3B.

Through this operation, the phase difference calculation circuit 700 can sequentially read the respective focus detection signals stored in the storage regions of the DRAM 600 corresponding to the consecutive read addresses RADR1 to RADR100 and the read addresses RADR101 to RADR200, and performs a calculation of a phase difference based on the focus detection signals output from the respective focus detecting pixel groups.

As described above, in the imaging device according 10 to the present embodiment, the horizontal direction focus detection processing circuit 400 stores the phase difference pixel row signal in the DRAM 600 in the same format regardless of the arrangement position of the focus detecting pixel which is arranged in the solid-state imaging device 100 and to be subjected to the focus detection in the horizontal direction, that is, the format of the focus detection signal input from the solid-state imaging device 100. Through this operation, the phase difference calculation circuit 700 can generate the evaluation value for phase difference AF for a subject image whose brightness changes in the horizontal direction through the same operation regardless of the format of the focus detection signal input from the solid-state imaging device 100.

Next, an example in which, in format conversion of the focus detection signals in the imaging device 10, the focus detecting pixels are arranged in the vertical direction in the imaging region of the solid-state imaging device 100 will be described.

Figure 6A:
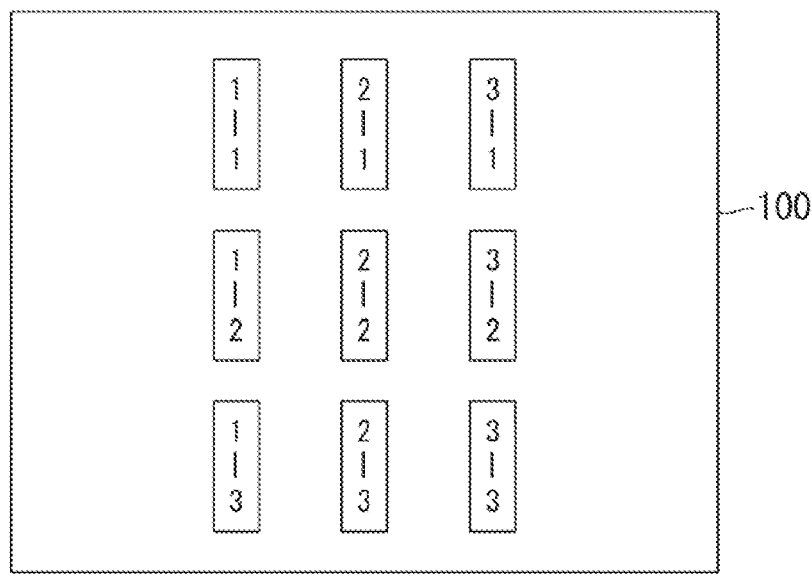
FIG. 6A is a diagram for describing a constitution of a vertical direction focus detection processing circuit equipped in the imaging device according to the present embodiment.
Figure 6B:
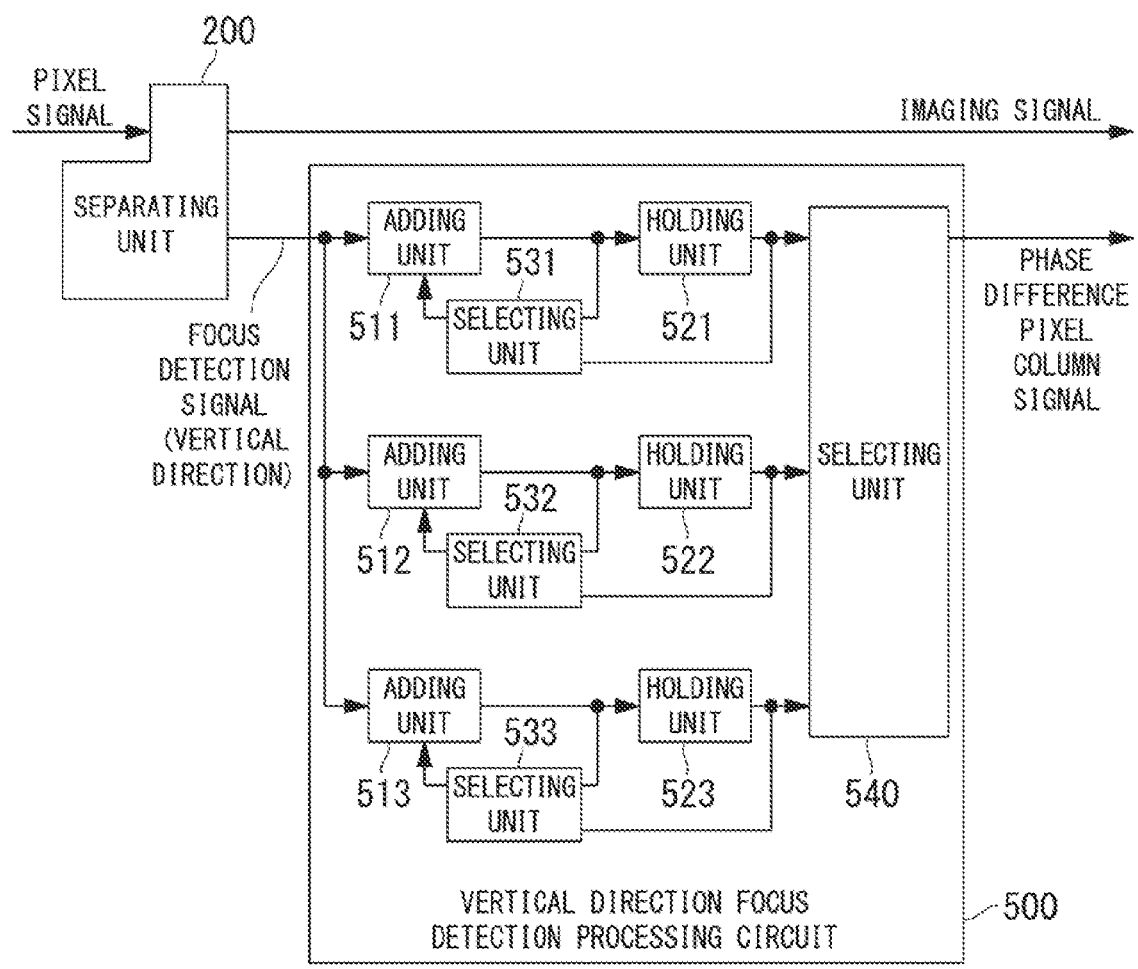
FIG. 6B is a diagram for describing a constitution of the vertical direction focus detection processing circuit equipped in the imaging device according to the present embodiment.

FIGS. 6A and 6B are diagrams for describing a constitution of the vertical direction focus detection processing circuit 500 equipped in the imaging device according 10 to the present embodiment. FIG. 6A illustrates an exemplary arrangement of the focus detecting pixels in the imaging region in the solid-state imaging device 100 corresponding to the vertical direction focus detection processing circuit 500. FIG. 6B is a block diagram illustrating the vertical direction focus detection processing circuit 500. FIG. 6B also illustrates the separating unit 200 that separates the focus detection signals of the vertical direction output from the focus detecting pixels arranged in the vertical direction in the imaging region from the pixel signal input from the solid-state imaging device 100 and outputs the focus detection signals to the vertical direction focus detection processing circuit 500.

The following description will proceed with an example in which the upper side is light-shielded, and the focus detecting pixels that output the focus detection signals representing a quantity of light of the lower side of a captured subject and the lower side are light-shielded as illustrated in FIG. 6A, and a plurality of focus detecting pixel groups (focus detecting pixel 1-1 to focus detecting pixel 3-3), each of which is a set of focus detecting pixels that output the focus detection signals representing a quantity of light of the upper side of a captured subject, is arranged at a plurality of positions in the vertical direction in the imaging region of the solid-state imaging device 100. Each focus detecting pixel group is assumed to include 50 sets of focus detecting pixels, that is, 100 focus detecting pixels.

As illustrated in FIG. 6B, the vertical direction focus detection processing circuit 500 includes adding units 511 to 513, holding units 521 to 523, first selecting units 531 to 533, and a second selecting unit 540. The vertical direction focus detection processing circuit 500 illustrated in FIG. 6B has a constitution corresponding to the solid-state imaging device 100 in which the focus detecting pixel groups are arranged in three columns as illustrated in FIG. 6A. More specifically, the adding unit 511, the holding unit 521, and the first selecting unit 531 in the vertical direction focus detection processing circuit 500 correspond to the focus detecting pixel groups 1-1, 1-2, and 1-3 which are arranged in the first column in the solid-state imaging device 100. Similarly, the adding unit 512, the holding unit 522, and the first selecting unit 532 in the vertical direction focus detection processing circuit 500 correspond to the focus detecting pixel groups 2-1, 2-2, and 2-3 which are arranged in the second column in the solid-state imaging device 100, and the adding unit 513, the holding unit 523, and the first selecting unit 533 correspond to the focus detecting pixel groups 3-1, 3-2, and 3-3 which are arranged in the third column in the solid-state imaging device 100. Thus, the vertical direction focus detection processing circuit 500 includes the adding units, the holding units, and the first selecting units corresponding thereto which are equal in number to the focus detecting pixel groups arranged in the horizontal direction in the imaging region of the solid-state imaging device 100.

The first selecting units 531 to 533 select the focus detection signals to be added by the corresponding adding units 511 to 513, and output the selected focus detection signals to the corresponding respective adding units 511 to 513. In the following description, when the first selecting unit 531, the first selecting unit 532, and the first selecting unit 533 need not be distinguished from one another, they are referred to as a "first selecting unit 530."

The second selecting unit 540 sequentially selects the focus detection signals held in the holding units 521 to 523, and sequentially stores the selected focus detection signals in a predetermined storage region of the DRAM 600 as phase difference pixel column signals.

The holding units 521 to 523 are memories such as SRAMs that hold the focus detection signals input from the corresponding respective adding units 511 to 513. The memory size of each of the holding units 521 to 523 is a maximum size by which all of the focus detection signals output from the focus detecting pixels arranged in the same column in the imaging region of the solid-state imaging device 100 can be held. More specifically, in the arrangement of the focus detecting pixels illustrated in FIG. 6A, since three focus detecting pixel groups are arranged in the same column, the memory size of each of the holding units 521 to 523 is the size by which the focus detection signals of 300 pixels (=100 pixels×3 groups) can be held. In the following description, when the holding unit 521, the holding unit 522, and the holding unit 523 need not be distinguished from one another, they are referred to as a "holding unit 520."

The respective adding units 511 to 513 add the previous added focus detection signals or the previous focus detection signals held in the corresponding holding units 521 to 523 to the current focus detection signals input from the separating unit 200, and output the added focus detection signals to the corresponding holding units 521 to 523. When the format of the focus detection signal stored in the DRAM 600 is the format in which the focus detection signals are added, the respective adding units 511 to 513 add the focus detection signals output from the respective focus detecting pixels included in the respective focus detecting pixel groups, and output the added focus detection signals to the corresponding holding units 521 to 523. Further, when the format of the focus detection signal stored in the DRAM 600 is the format in which the focus detection signals are not added, the respective adding units 511 to 513 output the focus detection signals input from the separating unit 200 to the corresponding respective holding units 521 to 523 without adding the focus detection signals. In the following description, when the adding unit 511, the adding unit 512, and the adding unit 513 need not be distinguished from one other, they are referred to as an "adding unit 510."

More specifically, when the format of the focus detection signal stored in the DRAM 600 is the format in which the focus detection signals output from the focus detecting pixels arranged over a plurality of columns in the same focus detecting pixel group are added, that is, the format in which the focus detection signals output from a plurality of consecutive focus detecting pixels arranged in the same row in the same focus detecting pixel group are added, the vertical direction focus detection processing circuit 500 operates as follows. The following description will be made with reference to an operation corresponding to the focus detecting pixel group arranged in any one column in the imaging region of the solid-state imaging device 100.

First of all, the first selecting unit 530 is set to the status in which the first selecting unit 530 selects the previous added focus detection signal as the focus detection signal to be added to the current focus detection signal input from the separating unit 200. Then, the adding unit 510 adds the current focus detection signal input from the separating unit 200 to the focus detection signal previously added (output) by the adding unit 510, and outputs the added focus detection signal to the corresponding holding unit 520. Then, after all the focus detection signals output from a plurality of consecutive focus detecting pixels arranged in the same row in the focus detecting pixel group are completed through the corresponding adding unit 510, the holding unit 520 holds the added focus detection signals input from the corresponding adding unit 510 in the corresponding holding regions.

Then, the second selecting unit 540 sequentially selects the focus detection signals held in the respective holding units 520 each time an output of the pixel signals of the focus detecting pixel group from the solid-state imaging device 100 is completed, that is, each time an input of as many focus detection signals as the number of rows included in the focus detecting pixel group from the separating unit 200 ends. The second selecting unit 540 sequentially stores the selected focus detection signals in a predetermined storage region of the DRAM 600 as the phase difference pixel column signal, for example, through burst access.

Further, when the format of the focus detection signal stored in the DRAM 600 is the format in which the focus detection signals output from the focus detecting pixels output from the focus detecting pixels arranged over a plurality of rows in the same focus detecting pixel group are added, that is, the format in which the focus detection signals output from the focus detecting pixels output from a plurality of focus detecting pixels arranged in the same column in the same focus detecting pixel group are added, the vertical direction focus detection processing circuit 500 operates as follows. The following description will also be made with reference to an operation corresponding to the focus detecting pixel group arranged in any column in the imaging region of the solid-state imaging device 100.

First of all, the first selecting unit 530 is set to the status in which the first selecting unit 530 selects the previous focus detection signal held in the corresponding holding unit 520 as the focus detection signal to be added to the current focus detection signal input from the separating unit 200. Then, the holding unit 520 outputs the focus detection signal which is currently held in the holding region corresponding to the current focus detection signal input from the separating unit 200, that is, the previous focus detection signal to be added to the current focus detection signal input from the separating unit 200 through the corresponding adding unit 510, to the corresponding adding unit 510. Then, the adding unit 510 adds the current focus detection signal input from the separating unit 200 to the corresponding previous focus detection signal output from the corresponding holding unit 520, and outputs the added focus detection signal to the corresponding holding unit 520. Then, the holding unit 520 overwrites the added focus detection signal input from the corresponding adding unit 510 in the holding region in which the output previous focus detection signal is held.

Then, the second selecting unit 540 sequentially selects the focus detection signals held in the respective holding units 520 each time an output of the pixel signals of the focus detecting pixel group from the solid-state imaging device 100 is completed, that is, each time an input of as many focus detection signals as the number of rows included in the focus detecting pixel group from the separating unit 200 ends. The second selecting unit 540 sequentially stores the selected focus detection signals in a predetermined storage region of the DRAM 600 as the phase difference pixel column signal, for example, through burst access.

Further, when the format of the focus detection signal stored in the DRAM 600 is the format in which the focus detection signals output from the respective focus detecting pixels in the focus detecting pixel group are stored with no change, that is, the format in which the focus detection signals are stored without being added, the vertical direction focus detection processing circuit 500 operates as follows. The following description will also be made with reference to an operation corresponding to the focus detecting pixel group arranged in any column in the imaging region of the solid-state imaging device 100. In the case of the format in which the focus detection signals are stored without being added, the first selecting unit 530 need not select the focus detection signal to be output to the adding unit 510, and thus the first selecting unit 530 may be set to the status in which the first selecting unit 530 selects either the previous added focus detection signal or the previous focus detection signal held in the corresponding holding unit 520.

First of all, the adding unit 510 outputs the current focus detection signal input from the separating unit 200 to the corresponding holding unit 520 with no change. Then, the holding unit 520 holds the current focus detection signals input from the corresponding adding unit 510 in the holding regions corresponding to the current focus detection signal input from the separating unit 200.

Then, the second selecting unit 540 sequentially selects the focus detection signals held in the respective holding units 520 each time an output of the pixel signals of the focus detecting pixel group from the solid-state imaging device 100 is completed, that is, each time an input of as many focus detection signals as the number of rows included in the focus detecting pixel group from the separating unit 200 ends. The second selecting unit 540 sequentially stores the selected focus detection signals in a predetermined storage region of the DRAM 600 as the phase difference pixel column signal, for example, through burst access.

As described above, the vertical direction focus detection processing circuit 500 performs conversion to the same format for each focus detecting pixel group, and causes the phase difference pixel column signal to be stored in a predetermined storage region of the DRAM 600 not only when the focus detecting pixel group is composed of a plurality of focus detecting pixels arranged in one column in the imaging region but also when the focus detecting pixel group is composed of a plurality of focus detecting pixels arranged in a plurality of columns the imaging region. Through this operation, the phase difference pixel column signals corresponding to the focus detecting pixel groups 1-1 to 3-3 are consecutively stored in a predetermined storage region of the DRAM 600. As described above, in the vertical direction focus detection processing circuit 500, even when the formats of the focus detection signals input from the solid-state imaging device 100 differ from each other due to a difference in an arrangement between the focus detecting pixels included in the focus detecting pixel group, the phase difference pixel column signals of the same format can be stored in the DRAM 600.

Here, an exemplary operation of the vertical direction focus detection processing circuit 500 will be described. FIGS. 7A to 7B are timing charts illustrating an exemplary operation timing of the vertical direction focus detection processing circuit 500 equipped in the imaging device according to the present embodiment. The timing charts illustrated in FIGS. 7A to 7B are timing charts when a set of focus detecting pixels are arranged in the same column in the vertical direction in the imaging region. FIG. 7A illustrates a timing when, in the solid-state imaging device 100 in which the focus detecting pixel groups, each of which includes 50 sets of focus detecting pixels, that is, 100 focus detecting pixels, arranged in the same column, are arranged at three positions (in the three columns) in the horizontal direction, the focus detection signals output from the respective focus detecting pixels included in each focus detecting pixel group are stored in the DRAM 600 in the format in which the focus detection signals are stored with no change. FIG. 7B illustrates an exemplary storage region of the DRAM 600 in which the phase difference pixel row signals are stored through the vertical direction focus detection processing circuit 500.

In the case of the format in which the focus detection signals output from the respective focus detecting pixel included in the focus detecting pixel group are stored in the DRAM 600 as the phase difference pixel column signals with no change, since the respective adding units 511 to 513 merely output the focus detection signals input from the separating unit 200 to the holding units 521 to 523 as is, an operation timing of each of the adding units 511 to 513 is omitted in FIG. 7A.

Similarly to a signal reading timing of the solid-state imaging device illustrated in FIG. 10C, the solid-state imaging device 100 outputs the pixel signals received from the respective pixels to the separating unit 200 in units of rows of the imaging region at a timing synchronized with the horizontal synchronous signal HD. As can be seen from FIG. 7A, when a set of focus detecting pixels is arranged in the same column in the vertical direction in the imaging region, that is, when a set of focus detecting pixels is arranged in different rows in the horizontal direction in the imaging region, respective sets of focus detection signals (the focus detection signals AF1 to AF3, the focus detection signals AF101 to AF103, and the focus detection signals AF201 to AF203) are separately included in the pixel signals read from the solid-state imaging device 100 at timings synchronized with the different horizontal synchronous signals HD.

For this reason, the separating unit 200 individually separates a set of focus detection signals from the pixel signals read at timings of the different horizontal synchronous signals HD, and outputs the respective focus detection signals to the corresponding adding units 511 to 513. The separating unit 200 separates the focus detection signals of the different focus detecting pixel groups from the pixel signals input from the solid-state imaging device 100 at a timing of the same horizontal synchronous signal HD, and outputs the focus detection signals to the corresponding adding units 511 to 513. In FIG. 7A, the separating unit 200 separates the focus detection signal AF1, the focus detection signal AF101, and the focus detection signal AF201 of the different focus detecting pixel groups from the pixel signals input from the solid-state imaging device 100 at a timing of the horizontal synchronous signal HD of the first row, and outputs the focus detection signal AF1, the focus detection signal AF101, and the focus detection signal AF201 to the corresponding adding units 511 to 513. Similarly, in FIG. 7A, the separating unit 200 separates the focus detection signal AF2, the focus detection signal AF102, and the focus detection signal AF202 from the pixel signals input from the solid-state imaging device 100 at a timing of the horizontal synchronous signal HD of the second row, and outputs the focus detection signal AF2, the focus detection signal AF102, and the focus detection signal AF202 to the corresponding adding units 511 to 513. Similarly, in FIG. 7A, the separating unit 200 separates the focus detection signal AF3, the focus detection signal AF103, and the focus detection signal AF203 from the pixel signals input from the solid-state imaging device 100 at a timing of the horizontal synchronous signal HD of the third row, and outputs the focus detection signal AF3, the focus detection signal AF103, and the focus detection signal AF203 to the corresponding adding units 511 to 513.

The respective adding units 511 to 513 output the focus detection signal input from the separating unit 200 to the corresponding respective holding units 521 to 523 with no change. The respective holding units 521 to 523 sequentially hold the focus detection signals input from the corresponding adding units 511 to 513, that is, the focus detection signals input from the separating unit 200, in the corresponding holding regions. In FIG. 7A, the holding unit 521, the holding unit 522, and the holding unit 523 hold the focus detection signal AF1 input from the corresponding adding unit 511, the focus detection signal AF101 input from the corresponding adding unit 512, and the focus detection signal AF201 input from the corresponding adding unit 513 in the holding region represented by the write address WA1, respectively, at a timing of the horizontal synchronous signal HD of the first row. Similarly, in FIG. 7A, the holding unit 521, the holding unit 522, and the holding unit 523 hold the focus detection signal AF2 input from the corresponding adding unit 511, the focus detection signal AF102 input from the corresponding adding unit 512, and the focus detection signal AF202 input from the corresponding adding unit 513 in the holding region represented by the write address WA2, respectively, at a timing of the horizontal synchronous signal HD of the second row. Similarly, in FIG. 7A, the holding unit 521, the holding unit 522, and the holding unit 523 hold the focus detection signal AF3 input from the corresponding adding unit 511, the focus detection signal AF103 input from the corresponding adding unit 512, and the focus detection signal AF203 input from the corresponding adding unit 513 in the holding region represented by the write address WA3, respectively, at a timing of the horizontal synchronous signal HD of the third row.

Then, after an output of the pixel signals of the focus detecting pixel group from the solid-state imaging device 100 is completed, the second selecting unit 540 sequentially reads the held focus detection signals in the order of the respective holding units 521 to 523, and causes the read focus detection signal to be stored in a predetermined storage region of the DRAM 600 as the phase difference pixel column signals. In FIG. 7A, first, the focus detection signals AF1 to AF100 held in the holding regions represented by the consecutive read addresses RA1 to RA100 of the holding unit 521 are sequentially read and then sequentially stored in the consecutive storage regions corresponding to the consecutive write addresses WADR1 to WADR100 of the DRAM 600. Then, the focus detection signals AF101 to AF200 held in the holding regions represented by the consecutive read addresses RA1 to RA100 of the holding unit 522 are sequentially read and then sequentially stored in the consecutive storage regions corresponding to the consecutive write addresses WADR101 to WADR200 of the DRAM 600. Finally, the focus detection signals AF201 to AF300 held in the holding regions represented by the consecutive read addresses RA1 to RA100 of the holding unit 523 are sequentially read and then sequentially stored in the consecutive storage regions corresponding to the consecutive write addresses WADR201 to WADR300 of the DRAM 600. Through this operation, the focus detection signals AF1 to AF300 are stored in the consecutive storage regions of the DRAM 600 corresponding to the write addresses WADR1 to 300 as illustrated in FIG. 7B.

Through this operation, the phase difference calculation circuit 700 can sequentially read the focus detection signals AF1 to AF100 and the focus detection signals AF101 to AF200 stored in the consecutive storage regions of the DRAM 600 corresponding to the read addresses RADR1 to RADR100, the read addresses RADR101 to RADR200, the read addresses RADR201 to RADR300, and the focus detection signals AF201 to AF300, and performs a calculation of a phase difference based on the focus detection signals output from each focus detecting pixel group.

As can be seen from FIG. 7A, the status of the storage region of the DRAM 600 in which the phase difference pixel column signal is stored by the vertical direction focus detection processing circuit 500 is identical to the status of the storage region of the DRAM 600 illustrated in FIG. 3B. In other words, the status of the storage region of the DRAM 600 in which the phase difference pixel column signal is stored by the vertical direction focus detection processing circuit 500 is identical to the status of the storage region of the DRAM 600 in which the phase difference pixel row signal is stored by the horizontal direction focus detection processing circuit 400. This corresponds to an example in which the focus detection signals are stored in the state in which the direction in which the focus detecting pixel groups used for detection of focus of a subject in the vertical direction (the up-down direction) are arranged is rotated 90° to be identical to the direction in which the focus detecting pixel groups used for detection of focus of a subject in the horizontal direction (the left-right direction) are arranged.

Next, another exemplary operation of the vertical direction focus detection processing circuit 500 will be described. An operation of the vertical direction focus detection processing circuit 500 which will be described below is an operation of the vertical direction focus detection processing circuit 500 when the format of the focus detection signal stored in the DRAM 600 is the format in which the focus detection signals output from the focus detecting pixels arranged over a plurality of columns in the same focus detecting pixel group are added, that is, the format in which the focus detection signals output from a plurality of consecutive focus detecting pixels arranged in the same row in the same focus detecting pixel group are added.

Figure 8A:
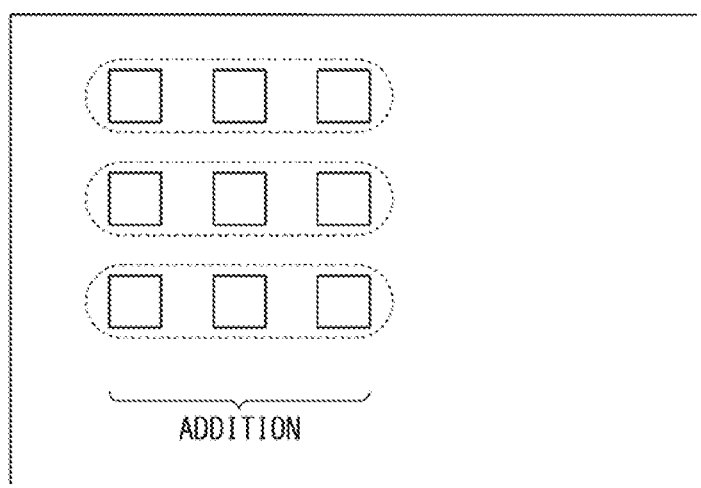
FIG. 8A is a diagram for describing a method of adding focus detection signals through the vertical direction focus detection processing circuit equipped in the imaging device according to the present embodiment.
Figure 8B:
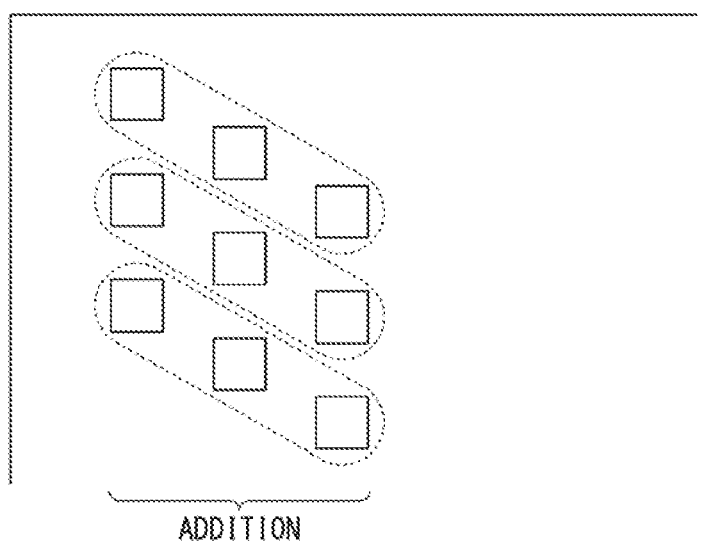
FIG. 8B is a diagram for describing a method of adding focus detection signals through the vertical direction focus detection processing circuit equipped in the imaging device according to the present embodiment.

First of all, an operation of adding the focus detection signals through the vertical direction focus detection processing circuit 500 will be described. FIGS. 8A and 8B are diagrams for describing a method of adding the focus detection signals through the vertical direction focus detection processing circuit 500 equipped in the imaging device according 10 to the present embodiment. As illustrated in FIG. 8A, the focus detecting pixels that output the focus detection signals to be added by the vertical direction focus detection processing circuit 500 are assumed to be arranged over three rows in the imaging region of the solid-state imaging device 100. In this case, the vertical direction focus detection processing circuit 500 adds the focus detection signals output from the three focus detecting pixels which are arranged in the same row in the horizontal direction and surrounded by a dotted line in FIG. 8A, and stores a single focus detection signal in the DRAM 600 as the addition result. In other words, in the arrangement of the focus detecting pixels illustrated in FIG. 8A, the vertical direction focus detection processing circuit 500 causes each of three focus detection signals, each of which is obtained by adding the focus detection signals of the three columns, to be stored in a predetermined storage region of the DRAM 600 as the phase difference pixel column signal.

An arrangement of the focus detecting pixels supported by the vertical direction focus detection processing circuit 500 is not limited to only addition of the focus detection signals output from the focus detecting pixels arranged in the same row in the horizontal direction as in the arrangement illustrated in FIG. 8A. For example, as illustrated in FIG. 8B, the focus detection signals output from the respective focus detecting pixels arranged in different rows may be added and stored in a predetermined storage region of the DRAM 600 as the phase difference pixel column signal. In this case, the vertical direction focus detection processing circuit 500 adds the focus detection signals output from the three focus detecting pixels which are arranged in different rows and surrounded by a dotted line in FIG. 8B, and causes a single focus detection signal in the DRAM 600 as the addition result. In other words, in the arrangement of the focus detecting pixels illustrated in FIG. 8B, the vertical direction focus detection processing circuit 500 causes each of three focus detection signals, each of which is obtained by adding the focus detection signals of the three rows in different rows, to be stored in a predetermined storage region of the DRAM 600 as the phase difference pixel column signal.

Next, an exemplary operation of adding the focus detection signals through the vertical direction focus detection processing circuit 500 will be described. FIGS. 9A and 9B are timing charts illustrating another exemplary operation timing of the vertical direction focus detection processing circuit 500 equipped in the imaging device according 10 to the present embodiment. The timing charts illustrated in FIGS. 9A and 9B are timing charts of the solid-state imaging device 100 having the constitution illustrated in FIG. 8A in which a set of focus detecting pixels are arranged in the same column in the vertical direction in the imaging region, and the focus detecting pixels that output the focus detection signals to be added in the same focus detecting pixel group are arranged over a plurality of columns. FIG. 9A illustrates a timing when, in the solid-state imaging device 100 in which the focus detecting pixel groups, each of which includes 50 sets of focus detecting pixels, that is, 100 focus detecting pixels, arranged in the same column, are arranged at three positions (in the three columns) in the horizontal direction and the focus detecting pixels that output the focus detection signals to be added are arranged over three columns, the focus detection signals output from the respective focus detecting pixels of the three columns included in each focus detecting pixel group are stored in the DRAM 600 in the format in which the focus detection signals are added and stored. Further, FIG. 9B illustrates an exemplary storage region of the DRAM 600 in which the phase difference pixel column signals are stored through the vertical direction focus detection processing circuit 500.

In the case of the format in which the focus detection signals of the same row output from the respective focus detecting pixel included in the focus detecting pixel group are added and then stored in the DRAM 600 as the phase difference pixel column signals, the respective adding units 511 to 513 add the previous added focus detection signals to the current focus detection signals input from the separating unit 200, and then output the added focus detection signals to the corresponding respective holding units 521 to 523. In FIG. 9A, the focus detection signals added in the respective adding units 511 to 513 are represented as added pixel signals.

Similarly to a pixel signal reading timing of the solid-state imaging device 100 illustrated in FIG. 7A, the solid-state imaging device 100 outputs the pixel signals received from the respective pixels to the separating unit 200 in units of rows of the imaging region at a timing synchronized with the horizontal synchronous signal HD. Then, similarly to a pixel signal reading timing of the solid-state imaging device 100 illustrated in FIG. 7A, a set of focus detection signals is separately included in the pixel signals read from the solid-state imaging device 100 at timings synchronized with the different horizontal synchronous signals HD. However, as can been seen from FIG. 9A, in the solid-state imaging device 100, since the focus detecting pixels that output the focus detection signals to be added are arranged over three columns, the focus detection signals to be added are consecutively included in the pixel signals of the three columns read from the solid-state imaging device 100.

For this reason, similarly to the pixel signal reading timing of the solid-state imaging device 100 illustrated in FIG. 7A, the separating unit 200 individually separates a set of focus detection signals from the pixel sugnals output at timings of the different horizontal synchronous signals HD, and outputs the respective focus detection signals to the corresponding respective adding units 511 to 513. Further, similarly to the pixel signal reading timing of the solid-state imaging device 100 illustrated in FIG. 7A, the separating unit 200 separates the focus detection signals of the different focus detecting pixel groups from the pixel signals input from the solid-state imaging device 100 at a timing of the same horizontal synchronous signal HD, and outputs the focus detection signals to the corresponding respective adding units 511 to 513. At this time, each time the pixel signals of the respective rows are input from the solid-state imaging device 100, the separating unit 200 sequentially outputs the focus detection signals of the respective rows to be added which are consecutively separated from the input pixel signals to the respective adding units 511 to 513 of the vertical direction focus detection processing circuit 500.

When the focus detection signals of the first row are input from the separating unit 200, the respective adding units 511 to 513 add the focus detection signals input from the separating unit 200, and output the added focus detection signals to the respective holding units 521 to 523. More specifically, when the focus detection signals of the first row are input, the adding unit 511 outputs the first focus detection signals which are output from the focus detecting pixels included in the first focus detecting pixel group and input through the separating unit 200 to the corresponding holding unit 521 as the added pixel signal with no change. Here, the output added pixel signal is input to the adding unit 511 again through the first selecting unit 531. Then, the adding unit 511 adds the added pixel signal input through the first selecting unit 531, that is, the immediately previous focus detection signal, to the next focus detection signal (the current focus detection signal) which is output from the focus detecting pixel included in the first focus detecting pixel group and input through the separating unit 200, and outputs the added focus detection signal to the corresponding holding unit 521 as the new added pixel signal. As described above, the adding unit 511 outputs the added pixel signal obtained by adding all the focus detection signals output from the focus detecting pixels included in the first focus detecting pixel group to the corresponding holding unit 521. Similarly, when the focus detection signals of the first row are input, the adding unit 512 and the adding unit 513 output the added pixel signals obtained by adding all the focus detection signals which are output from the focus detecting pixels included in the corresponding focus detecting pixel group and input through the separating unit 200 to the corresponding holding unit 522 and the holding unit 523.

At this time, similarly to the operation timing of the respective holding units 521 to 523 illustrated in FIG. 7A, the respective holding units 521 to 523 sequentially hold the added pixel signals input from the corresponding adding units 511 to 513, that is, the added pixel signals obtained by adding all the focus detection signals output from the focus detecting pixels included in the corresponding focus detecting pixel group through the corresponding adding units 511 to 513 in the corresponding holding regions. In FIG. 9A, at a timing of the horizontal synchronous signal HD of the first row, the holding unit 521, the holding unit 522, and the holding unit 523 hold the added pixel signal input from the corresponding adding unit 511, the added pixel signal input from the corresponding adding unit 512, and the added pixel signal input from the corresponding adding unit 513 in the holding region represented by the write address WA1 as the focus detection signal AF1, the focus detection signal AF101, and the focus detection signal AF201. Similarly, in FIG. 9A, at a timing of the horizontal synchronous signal HD of the second row, the holding unit 521, the holding unit 522, and the holding unit 523 hold the added pixel signal input from the corresponding adding unit 511, the added pixel signal input from the corresponding adding unit 512, and the added pixel signal input from the corresponding adding unit 513 in the holding region represented by the write address WA2 as the focus detection signal AF2, the focus detection signal AF102, and the focus detection signal AF202. Similarly, in FIG. 9A, at a timing of the horizontal synchronous signal HD of the second row, the holding unit 521, the holding unit 522, and the holding unit 523 hold the added pixel signal input from the corresponding adding unit 511, the added pixel signal input from the corresponding adding unit 512, and the added pixel signal input from the corresponding adding unit 513 in the holding region represented by the write address WA3 as the focus detection signal AF3, the focus detection signal AF103, and the focus detection signal AF203.

Then, after an input of the pixel signals of the focus detecting pixel group from the solid-state imaging device 100 is completed, the second selecting unit 540 sequentially reads the held focus detection signals in the order of the respective holding units 521 to 523, and causes the read focus detection signal to be stored in a predetermined storage region of the DRAM 600 as the phase difference pixel column signals. In FIG. 9A, first, the focus detection signals AF1 to AF100 held in the holding regions represented by the consecutive read addresses RA1 to RA100 of the holding unit 521 are sequentially read and then sequentially stored in the consecutive storage regions corresponding to the consecutive write addresses WADR1 to WADR100 of the DRAM 600. Then, the focus detection signals AF101 to AF200 held in the holding regions represented by the consecutive read addresses RA1 to RA100 of the holding unit 522 are sequentially read and then sequentially stored in the consecutive storage regions corresponding to the consecutive write addresses WADR101 to WADR200 of the DRAM 600. Finally, the focus detection signals AF201 to AF300 held in the holding regions represented by the consecutive read addresses RA1 to RA100 of the holding unit 523 are sequentially read and then sequentially stored in the consecutive storage regions of the DRAM 600 corresponding to the consecutive write addresses WADR201 to WADR300.

As described above, the focus detection signals AF1 to AF300, each of which is one of the added pixel signals obtained by adding all the focus detection signals output from the focus detecting pixels included in the corresponding focus detecting pixel group through the respective adding units 511 to 513, are consecutively stored in the storage regions of the DRAM 600 corresponding to the consecutive write addresses WADR1 to WADR300. At this time, the status of the storage region of the DRAM 600 after the phase difference pixel column signal is stored by the vertical direction focus detection processing circuit 500 is identical to the status of the storage region of the DRAM 600 illustrated in FIG. 7B.

Through this operation, the phase difference calculation circuit 700 can sequentially read the focus detection signals AF1 to AF100 and the focus detection signals AF101 to AF200 stored in the consecutive storage regions of the DRAM 600 corresponding to the read addresses RADR1 to RADR100, the read addresses RADR101 to RADR200, the read addresses RADR201 to RADR300, and the focus detection signals AF201 to AF300, and performs a calculation of a phase difference based on the focus detection signals output from each focus detecting pixel group.

As described above, in the imaging device according 10 to the present embodiment, the vertical direction focus detection processing circuit 500 stores the phase difference pixel column signal in the DRAM 600 in the same format regardless of the arrangement position of the focus detecting pixel which is arranged in the solid-state imaging device 100 and used for focus detection in the vertical direction, that is, the format of the focus detection signal input from the solid-state imaging device 100. Through this operation, the phase difference calculation circuit 700 can generate the evaluation value for phase difference AF for a subject image whose brightness changes in the vertical direction through the same operation regardless of the format of the focus detection signal input from the solid-state imaging device 100.

The format of the focus detection signal stored in the DRAM 600 is the format in which the focus detection signals output from the focus detecting pixels output from the focus detecting pixels arranged over a plurality of rows in the same focus detecting pixel group are added. In other words, in this case, even when the format of the focus detection signal is the format in which the focus detection signals output from the focus detecting pixels output from a plurality of focus detecting pixels arranged in the same column in the same focus detecting pixel group are added, the status of the storage region of the DRAM 600 after the phase difference pixel column signal is stored is identical to the status of the storage region of the DRAM 600 illustrated in FIG. 7B.

In the case of this format, the operation timing of the vertical direction focus detection processing circuit 500 can be considered to be similar to the timing chart when the focus detection signal is stored in the DRAM 600 in the format in which the focus detection signals are added and stored in the horizontal direction focus detection processing circuit 400 illustrated in FIG. 5. In other words, an operation is performed such that the focus detection signal obtained by adding the current focus detection signal input from the separating unit 200 to the previous focus detection signal output from the holding unit 520 is overwritten in the corresponding holding region of the holding unit 520. Thus, the detailed description of a timing of an operation of adding a plurality of focus detection signals arranged in the same column in the same detecting pixel group and storing the added focus detection signal in the DRAM 600 in the vertical direction focus detection processing circuit 500 is omitted.

As described above, according to the embodiments of the present invention, in the imaging device with the solid-state imaging device in which the imaging pixels and the focus detecting pixels are arranged together in the imaging region, when the pixel signal is read from the solid-state imaging device, the focus detection signal is read as well, and the separating unit separates the image signal and the focus detection signal from the read pixel signal. Then, the horizontal direction focus detection processing circuit converts the format of the focus detection signal which is output from the solid-state imaging device and used for focus detection in the horizontal direction into a format of the focus detection signal to be processed by the phase difference calculation circuit, and then stores the focus detection signal of the converted format in the DRAM. Further, the vertical direction focus detection processing circuit converts the format of the focus detection signal which is output from the solid-state imaging device and used for focus detection in the vertical direction into a format of the focus detection signal to be processed by the phase difference calculation circuit, and then stores the focus detection signal of the converted format in the DRAM. Through this operation, in the embodiment of the present invention, the phase difference calculation circuit equipped in the imaging device can read the focus detection signal stored in the DRAM in the same format regardless of the format of the focus detection signal input from the solid-state imaging device and generate the evaluation value for phase difference AF based on the read focus detection signal.

Further, in the embodiment of the present invention, when the focus detection signals of the format converted by the horizontal direction focus detection processing circuit and the vertical direction focus detection processing circuit are stored in the DRAM, the focus detection signals are stored in predetermined consecutive storage regions of the DRAM together for each of the focus detecting pixel groups arranged in the imaging region of the solid-state imaging device. Through this operation, in the embodiment of the present invention, when the focus detection signals are stored in the DRAM or when the focus detection signals are read from the DRAM, only the access storage regions of the DRAM need be accessed, and thus it is possible to access the DRAM through the efficient access method. As a result, in the embodiment of the present invention, it is possible to access the DRAM in the imaging device in a desirable state even from a point of view of a bus band.

Further, in the embodiment of the present invention, since a method of accessing the DRAM is efficiently performed, a method of generating a read address and a write address used to access the DRAM can be easily performed. As a result, in the embodiment of the present invention, it is possible to reduce a circuit size of a circuit (in the present embodiment, the horizontal direction focus detection processing circuit 400, the vertical direction focus detection processing circuit 500, and the phase difference calculation circuit 700) that generates an address on the DRAM.

For convenience of description, the present embodiment has been described in connection with the example in which either of the focus detecting pixel group used for focus detection of the subject in the horizontal direction (the left-right direction) and the focus detecting pixel group used for focus detection of the subject in the vertical direction (the up-down direction) is arranged in the imaging region of the solid-state imaging device 100. However, an arrangement of the focus detecting pixels which are arranged in the imaging region of the solid-state imaging device 100 and used for focus detection is not limited only to the method described in the embodiment of the present invention, and the concept of the present invention can be similarly applied to a solid-state imaging device in which both of the focus detecting pixel group used for focus detection of the subject in the horizontal direction (the left-right direction) and the focus detecting pixel group used for focus detection of the subject in the vertical direction (the up-down direction) are arranged.

Further, the present embodiment has been described in connection with the vertical direction focus detection processing circuit 500 having the constitution illustrated in FIG. 6B that includes the adding units 510 which are equal in number to the focus detecting pixel groups arranged in the horizontal direction in the imaging region of the solid-state imaging device 100. However, as can be seen from FIG. 9A, the adding units 510 need not perform addition of the focus detection signals at the same time. Thus, the constitution of the adding unit 510 equipped in the vertical direction focus detection processing circuit 500 is not limited only to the method described in the embodiment of the present invention. For example, the vertical direction focus detection processing circuit 500 may have a single adding unit 510 which is shared by the respective holding units 520. Through this constitution, the circuit size of the vertical direction focus detection processing circuit 500 can be reduced. When the adding unit is shared, a third selecting unit that selects the holding unit 520 to which the added pixel signal output from the shared adding unit 510 is output and a fourth selecting unit that selects the holding unit 520 that holds the previous focus detection signal to be output to the shared adding unit 510 through the first selecting unit 530 may be added. At this time, although the circuit size is increased by the third selecting unit and the fourth selecting unit, since the adding unit is shared, the circuit size is reduced, and thus an effect of reducing the circuit size of the vertical direction focus detection processing circuit 500 is obtained.

Further, the present embodiment has been described in connection with the vertical direction focus detection processing circuit 500 having the constitution illustrated in FIG. 6B that includes the holding units 520 which are equal in number to the focus detecting pixel groups arranged in the horizontal direction in the imaging region of the solid-state imaging device 100. However, the constitution of the holding unit 520 equipped in the vertical direction focus detection processing circuit 500 is not limited only to the method described in the embodiment of the present invention. For example, the vertical direction focus detection processing circuit 500 includes one holding unit 520, and the holding unit 520 may be configured to have holding regions which are divided according to the number of focus detecting pixel groups arranged in the horizontal direction in the imaging region of the solid-state imaging device 100.

Further, the present embodiment has been described in connection with the example in which the imaging device 10 includes the horizontal direction focus detection processing circuit 400 and the vertical direction focus detection processing circuit 500 as the circuit that converts the format of the focus detection signal. However, as can be seen from FIGS. 2B and 6B, the components of the vertical direction focus detection processing circuit 500 may be connected, similarly to the way in which the components of the horizontal direction focus detection processing circuit 400 are connected. Thus, the constitution in which the adding unit 410 equipped in the horizontal direction focus detection processing circuit 400 and the adding unit 510 equipped in the vertical direction focus detection processing circuit 500 are shared or the constitution in which the holding unit 420 equipped in the horizontal direction focus detection processing circuit 400 and the holding unit 520 equipped in the vertical direction focus detection processing circuit 500 are shared can be made. Further, the holding unit 420 equipped in the horizontal direction focus detection processing circuit 400 may be integrated with the holding unit 520 equipped in the vertical direction focus detection processing circuit 500, and the holding region may be divided in this constitution.

Further, in the present embodiment, the holding unit 420 and the holding unit 520 are described as having the maximum size by which all the focus detection signals output from the respective focus detecting pixels arranged in the same row or the same column in the imaging region of the solid-state imaging device 100 can be held. However, the memory size of the holding unit 420 and the holding unit 520 is not limited only to the method described in the embodiment of the present invention. For example, when each burst access can be delimited in burst access to the DRAM, the memory size may be decided based on the range of the burst access.

Even when the horizontal direction and the vertical direction are reversely regarded in the present embodiment, the concept of the present invention can be similarly applied.

Further, the arrangement of the focus detecting pixel group or the number of focus detecting pixels in the row direction and the column direction included in the focus detecting pixel group is not limited to the embodiment of the present invention, and the arrangement of the focus detecting pixel group or the number of focus detecting pixels in the row direction and the column direction included in the focus detecting pixel group may be changed within the scope not departing from the gist of the present invention.

Although the exemplary embodiments of the present invention have been described above, the present invention is not limited to the above embodiments. Additions, omissions, replacements, or other changes of the components may be made within the scope not departing from the gist of the present invention. The present invention is not limited by the above description but is limited only by the appended claims set forth below.

What is claimed is:

1. An imaging device comprising:
a solid-state imaging device including focus detecting pixels which are arranged together in a region in which imaging pixels are arranged in a form of a two-dimensional (2 D) matrix, and configured to output imaging signals according to subject light incident on the imaging pixels and focus detection signals according to a quantity of light incident on the focus detecting pixels as pixel signals;
a separating unit configured to separate the imaging signals and the focus detection signals from the pixel signals output from the solid-state imaging device, to output the focus detection signals output from the focus detecting pixels included in a horizontal direction focus detecting pixel set in which two focus detecting pixels outputting the focus detection signals according to a quantity of light incident in different directions in a row direction in the region of the solid-state imaging device are arranged as a set as a horizontal direction focus detection signal, and to output the focus detection signals output from the focus detecting pixels included in a vertical direction focus detecting pixel set in which two focus detecting pixels outputting the focus detection signals according to a quantity of light incident in different directions in a column direction in the region of the solid-state imaging device are arranged as a set as a vertical direction focus detention signal;
a horizontal direction focus detection processing circuit configured to convert a format in which the horizontal direction focus detection signals separated by the separating unit are output from a format in which the focus detection signals included in the horizontal direction focus detection signal are output from the solid-state imaging device into a predetermined format, and then to output the horizontal direction focus detention signals;
a vertical direction focus detection processing circuit configured to convert a format in which the vertical direction focus detection signals separated by the separating unit are output from a format in which the focus detection signals included in the vertical direction focus detection signal are output from the solid-state imaging device into a predetermined format, and then to output the vertical direction focus detection signals;
wherein the horizontal direction focus detection processing circuit and the vertical direction focus detection processing unit are configured to convert the format of the focus detection signals included in the horizontal direction focus detection signal separated by the separating unit and the format of the focus detection signals included in the vertical direction focus detection signal separated by the separating unit so that the horizontal direction focus detection signal and the vertical direction focus detection signal, which are converted into a format and output, have a predetermined same format;
wherein the horizontal direction focus detection processing circuit includes a horizontal direction holding unit configured to hold the input horizontal direction focus detection signals by a predetermined number used in a focus detection process,
the focus detection signals included in the horizontal direction focus detection signals input from the separating unit at different timings are held in the horizontal direction holding unit, and the focus detection signals held in the horizontal direction holding unit are sequentially output from a predetermined timing as the focus detection signals included in the horizontal direction focus detection signal which is converted in format and output
wherein the horizontal direction holding unit configured to hold all the focus detection signals output from the focus detecting pixels of a row having the largest number of horizontal direction focus detecting pixel sets in the region of the solid-state imaging device;
wherein the horizontal direction focus detection processing circuit includes a horizontal direction adding unit configured to add the focus detection signals output from the corresponding focus detecting pixels included in the horizontal direction focus detecting pixel sets arranged in different rows,
the horizontal direction holding unit is configured to hold the focus detection signals added by the horizontal direction adding unit,
the horizontal direction adding unit is configured to add the focus detection signals held in the horizontal direction holding unit to the focus detection signals output from the corresponding focus detecting pixels and input through the separating unit, and
the horizontal direction holding unit is configured to sequentially output the held focus detection signals as the focus detection signals included in the horizontal direction focus detection signal which is converted into a format and output for each horizontal direction focus detecting pixel group after all the focus detection signals output from the corresponding focus detecting pixel included in a horizontal direction focus detecting pixel group including horizontal direction focus detecting pixel sets arranged in the row direction are added through the horizontal direction adding unit.

2. An imaging device comprising:
a solid-state imaging device including focus detecting pixels which are arranged together in a region in which imaging pixels are arranged in a form of two-dimensional (2 D) matrix, and configured to output imaging signals according to subject light incident on the imaging pixels and focus detection signals according to a quantity of light incident on the focus detecting pixels as pixel signals;
a separating unit configured to separate the imaging signals and the focus detection signals from the pixel signals output from the solid-state imaging device, to output the focus detection signals output from the focus detecting pixels included in a horizontal direction focus detecting pixel set in which two focus detecting pixels outputting the focus detection signals according to a quantity of light incident in different directions in a row direction in the region of the solid-state imaging device are arranged as a set as a horizontal direction focus signal, and to output the focus detection signals output from the focus detecting pixels included in a vertical direction focus detecting pixel set in which two focus detecting pixels outputting the focus detection signals according to a quantity of light incident in different directions in a column direction in the region of the solid-state imaging device are arranged as a set as a vertical direction focus detection signal;

a horizontal direction focus detection processing circuit configured to convert a format in which the horizontal direction focus detection signals separated by the separating unit are output from a format in which the focus detection signals included the horizontal direction focus detection signal are output from the solid-state imaging device into a predetermined format, and then to output the horizontal direction focus detection signals;

a vertical direction focus detection processing circuit configured to convert a format in which the vertical direction focus detection signals separated by the separating unit are output from a format in which the focus detection signals included in the vertical direction focus detection signal are output from the solid-state imaging device into a predetermined format, and then to output the vertical direction focus detection signals;

wherein the horizontal direction focus detection processing circuit and the vertical direction focus detection processing unit are configured to convert the format of the focus detection signals included in the horizontal direction focus detection signal separated by the separating unit and the format of the focus detection signals included in the vertical direction focus detection signal separated by the separating unit so that the horizontal direction focus detection signal and the vertical direction focus detection signal, which are converted into a format and output, have a predetermined same format;

wherein the vertical direction focus detection processing circuit includes a vertical direction holding unit configured to hold the input vertical direction focus detection signals by a predetermined number used in a focus detection process;

the focus detection signals included in the vertical direction focus detection signals input from the separating unit at different timings are held in the vertical direction holding unit, and the focus detection signals held in the vertical direction holding unit are sequentially output from a predetermined timing as the focus detection signals included in the vertical direction focus detection signal which is converted in format and output;

wherein the vertical direction holding unit is configured to hold all the focus detection signals output from the focus detecting pixels of a row having the largest number of vertical direction focus detecting pixel sets in the region of the solid-state imaging device;

wherein the vertical direction focus detection processing circuit includes a vertical direction adding unit configured to add the focus detection signals output from the corresponding focus detecting pixels included in the vertical direction focus detecting pixel sets arranged in either or both of different columns and different rows, the vertical direction holding unit is configured to hold the focus detection signals added by the vertical direction adding unit, the vertical direction adding unit is configured to add the focus detection signals held in the vertical direction holding unit to the focus detection signals output from the corresponding focus detecting pixels and input through the separating unit, and the vertical direction holding unit is configured to sequentially output the held focus detection signals as the focus detection signals included in the vertical direction focus detection signal which is converted into a format and output for each vertical direction focus detecting pixel group after all the focus detection signals output from the corresponding focus detecting pixel included in a vertical direction focus detecting pixel group including vertical direction focus detecting pixel sets arranged in either or both of the row direction and the column direction are added through the vertical direction adding unit.

3. The imaging device according to claim 2,
wherein the vertical direction focus detection processing unit includes
the vertical direction holding units which are equal in number to the vertical direction focus detecting pixel groups arranged in the row direction in the region of the solid-state imaging device, and
the vertical direction adding units which are equal in number to the vertical direction focus detecting pixel groups arranged in the row direction in the region of the solid-state imaging device
wherein the focus detection signals output from the focus detecting pixels included in the respective vertical direction focus detecting pixel groups are added by the vertical direction adding units corresponding to the respective vertical direction focus detecting pixel groups and all held in the corresponding vertical direction holding units, and then the focus detection signals held in the respective vertical direction holding units are sequentially output as the focus detection signals included in the vertical direction focus detection signal which is converted in format and output for each vertical direction holding unit.

4. The imaging device according to claim 2,
wherein the vertical direction focus detection processing unit includes
the vertical direction holding units which are equal in number to the vertical direction focus detecting pixel groups arranged in the row direction in the region of the solid-state imaging device and
a vertical direction adding unit shared by all the vertical direction holding units, and
the focus detection signals output from the focus detecting pixels included in the respective vertical direction focus detecting pixel groups are added for each of the vertical direction focus detecting pixel groups through the vertical direction adding unit and all held in the corresponding respective vertical direction holding units, and then the focus detection signals held in the respective vertical direction holding units are sequentially output as the focus detection signals included in the vertical direction focus detection signal which is converted in format and output for each vertical direction holding unit.

5. The imaging device according to claim 2,
wherein the vertical direction holding unit is configured such that a holding region of one holding unit is divided into divisional holding regions which are equal in number to the vertical direction focus detecting pixel groups arranged in the row direction in the region of the solid-state imaging device, and
the focus detection signals output from the focus detecting pixels included in the respective vertical direction focus detecting pixel groups are added through the vertical direction adding units corresponding to the respective vertical direction focus detecting pixel groups and all held in the corresponding respective divisional holding regions, and then the focus detection signals held in the respective divisional holding regions are sequentially output as the focus detection signals included in the vertical direction focus detection signal which is converted in format and output for each divisional holding region.

6. The imaging device according to claim 5,
wherein the vertical direction holding unit is configured such that the holding region of one holding unit is divided into divisional holding regions having a size by which all the focus detection signals output from the focus detecting pixels of a column having the largest number of vertical direction focus detecting pixel sets are held in the region of the solid-state imaging device.

7. The imaging device according to claim 2,
wherein the vertical direction holding unit is configured such that the holding region of one holding unit is divided into divisional holding regions having a size by which the focus detection signals output from the focus detecting pixels are delimited in units of a predetermined number.

\* \* \* \* \*